United States Patent
Fardon et al.

(10) Patent No.: US 11,982,387 B2
(45) Date of Patent: May 14, 2024

(54) PIPE COUPLING FOR RECEIVING, HOLDING AND RELEASING A PIPE AND A METHOD OF ASSEMBLING A PIPE COUPLING

(71) Applicant: Wavin B.V., Schiphol (NL)

(72) Inventors: Mark Fardon, Dedemsvaart (NL); Josef Luke Allen, Dedemsvaart (NL); Gordon John Alexander Farquhar, Dedemsvaart (NL); Oliver Macpherson Ross, Dedemsvaart (NL)

(73) Assignee: Wavin B.V., Schiphol (NL)

( * ) Notice: Subject to any disclaimer, the term of this patent is extended or adjusted under 35 U.S.C. 154(b) by 50 days.

(21) Appl. No.: 17/777,539

(22) PCT Filed: Nov. 20, 2020

(86) PCT No.: PCT/NL2020/050733
§ 371 (c)(1),
(2) Date: May 17, 2022

(87) PCT Pub. No.: WO2021/101383
PCT Pub. Date: May 27, 2021

(65) Prior Publication Data
US 2023/0341071 A1    Oct. 26, 2023

(30) Foreign Application Priority Data
Nov. 22, 2019    (NL) .................................... 2024297

(51) Int. Cl.
*F16L 37/092*    (2006.01)
(52) U.S. Cl.
CPC ....... *F16L 37/0925* (2013.01); *F16L 2201/10* (2013.01)

(58) Field of Classification Search
CPC ... F16L 37/098; F16L 37/0987; F16L 37/091; F16L 37/0915; F16L 37/0925;
(Continued)

(56) References Cited

U.S. PATENT DOCUMENTS

| 4,637,636 A | * | 1/1987 | Guest | ................. F16L 37/0925 |
|---|---|---|---|---|
| | | | | 285/38 |
| 5,320,326 A | * | 6/1994 | Ju | ...................... F16L 37/0915 |
| | | | | 251/149.6 |

(Continued)

FOREIGN PATENT DOCUMENTS

| EP | 0 945 662 A2 | 9/1999 |
|---|---|---|
| EP | 1 178 255 A2 | 2/2002 |

(Continued)

OTHER PUBLICATIONS

International Search Report and Written Opinion in International Application No. PCT/NL2020/050733, mailed Jun. 7, 2021.

(Continued)

*Primary Examiner* — Aaron M Dunwoody
(74) *Attorney, Agent, or Firm* — Joseph T. Leone; DeWitt LLP

(57) ABSTRACT

A pipe coupling (100) for receiving, holding and releasing a pipe, comprising a coupling body (110) having a bore (B) with a geometric axis (A) into which a pipe can be inserted in a pipe insertion direction (P); a rotatable sleeve (170) which is arranged at least partially around the coupling body (110) and which is rotatable around the axis of the bore with (Continued)

respect to the coupling body (110); a gripping element (140) configured to engage a surface of the pipe; a pipe release element (160) configured to disengage the gripping element (140) from the surface of the pipe upon axial movement of the pipe release element (160); and a release collar (180) coupled to an end of the rotatable sleeve (170). Axial rotation of the rotatable sleeve (170) in a first direction causes the release collar (180) to move axially from a locked position to an unlocked position and wherein in the unlocked position, the release collar (180) can be moved axially in a pipe insertion direction (P) to cause the pipe release element (160) to disengage the gripping element (140) from the surface of the pipe.

17 Claims, 16 Drawing Sheets

(58) Field of Classification Search
CPC . F16L 37/0982; F16L 37/1215; F16L 37/122; F16L 37/127; F16L 37/133; F16L 37/138; F16L 2201/10
See application file for complete search history.

(56) References Cited

U.S. PATENT DOCUMENTS

| | | | |
|---|---|---|---|
| 9,671,049 B1* | 6/2017 | Crompton | F16L 19/07 |
| 2015/0323112 A1* | 11/2015 | Wright | F16L 21/03 |
| | | | 285/349 |

FOREIGN PATENT DOCUMENTS

| | | |
|---|---|---|
| EP | 1 521 027 A1 | 4/2005 |
| EP | 1 398 559 B1 | 3/2006 |
| EP | 2 860 435 A1 | 4/2015 |
| GB | 2 300 682 A | 11/1996 |
| WO | WO 2018/168614 A1 | 9/2018 |

OTHER PUBLICATIONS

International Preliminary Report on Patentability in International Application No. PCT/NL2020/050733, mailed May 17, 2022.

* cited by examiner

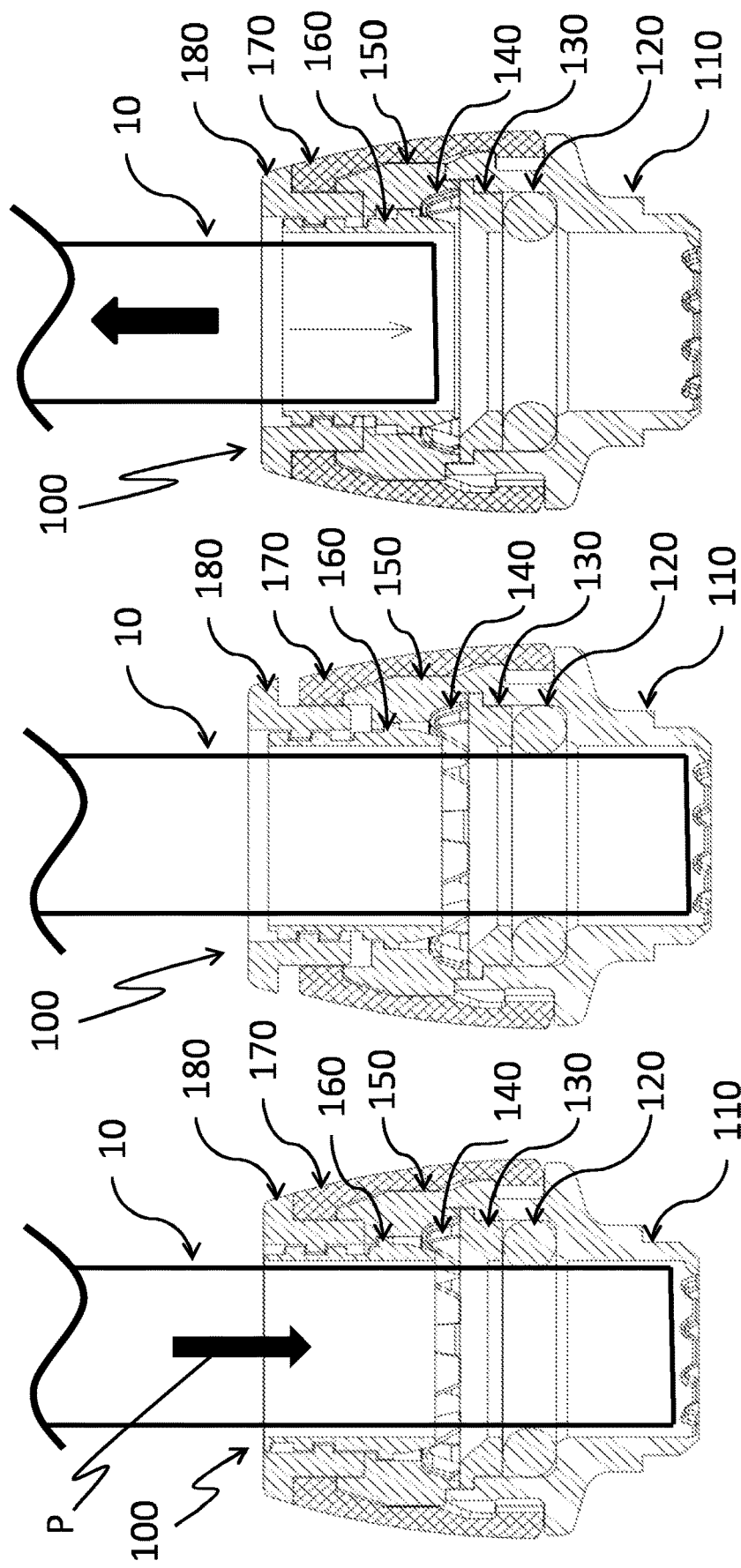

PIPE COUPLING FOR RECEIVING, HOLDING AND RELEASING A PIPE AND A METHOD OF ASSEMBLING A PIPE COUPLING

CROSS-REFERENCE TO RELATED APPLICATIONS

This application is a national stage filing under 35 U.S.C. § 371 of International Patent Application Serial No. PCT/NL2020/050733, filed Nov. 20, 2020, which claims priority to Netherlands application number 2024297 filed Nov. 22, 2019, each of which is incorporated herein by reference in their entirety.

TECHNICAL FIELD

The present disclosure relates to a pipe coupling for receiving, holding and releasing a pipe and a method of assembling a pipe coupling.

BACKGROUND

Pipe couplings are connecting elements which allow two or more pipes to be joined together. They are used extensively in domestic plumbing applications such as for water supply, heating and sanitation as well as in industrial applications.

Specifically in domestic plumbing applications, push-fit pipe couplings are widely used. Push-fit pipe couplings are simple to use and quick to install, as they only require the end of the pipe to be pushed into the pipe coupling in order to achieve a secure fit with the coupling. This greatly reduces the time required and complexity of laying pipework compared to other types of couplings. Push-fit couplings generally comprise a coupling body in which a bore is provided for receiving an end of the pipe to be connected, and gripping means that grip the surface of the pipe so as to prevent the pipe from being withdrawn from the pipe coupling.

Some known push-fit pipe couplings are releasable and allow the pipe coupling to be detached from the pipe so that the pipe and pipe coupling can be reused.

Some known releasable push-fit couplings use separate release tools which are used to press down on a release element which disengages the gripping element from the surface of the pipe. One such pipe coupling and release tool is disclosed in WO2010/136606.

The problem with using a separate release tool is that pipes are often fitted in tight spaces where there might not be room to attach and operate a release tool. Furthermore, separate release tools often get lost.

Other releasable push-fit couplings, such as the one disclosed in EP1398559B1, use a collet with gripping means and a head projecting out of the end of the coupling which can be depressed to disengage the gripping means and release the pipe. The coupling further comprises an end cap which is screwed on to tighten the collet and fix the pipe in place. However, when using this coupling, the installation requires an extra step of screwing on the end cap to lock the pipe in place increasing complexity of installation. Furthermore, it can be difficult to determine when the pipe coupling is in a locked configuration which can lead to accidental release of the pipe. These types of coupling can also be prone to accidental unscrewing of the end cap and therefore accidental release of the pipe due to thermal expansion and vibration, for example.

In view of the above, there is a need for an improved pipe coupling which allows simple and quick connection to a pipe without any extra steps. There is also a need for an improved pipe coupling which in a locked configuration effectively prevents accidental release of the pipe and has a simple and effective release mechanism. Furthermore, there is a need for an improved pipe coupling which prevents accidental unscrewing and release of the pipe due to thermal expansion and vibration.

SUMMARY

In a first aspect of the present invention, there is provided a pipe coupling for receiving, holding and releasing a pipe. The pipe coupling comprises a coupling body having a bore with a geometric axis into which a pipe can be inserted in a pipe insertion direction. The pipe coupling further comprises a rotatable sleeve which is arranged at least partially around the coupling body and which is rotatable around the axis of the bore with respect to the coupling body. The pipe coupling further comprises a gripping element configured to engage a surface of the pipe. The pipe coupling further comprises a pipe release element configured to disengage the gripping element from the surface of the pipe upon axial movement of the pipe release element and a release collar coupled to an end of the rotatable sleeve. Axial rotation of the rotatable sleeve in a first direction causes the release collar to move axially from a locked position to an unlocked position. In the unlocked position, the release collar can be moved axially in a pipe insertion direction to cause the pipe release element to disengage the gripping element from the surface of the pipe.

In some embodiments, this may result in a pipe coupling which allows a simple and quick connection to a pipe and release of the pipe.

In some embodiments, this may further result in a pipe coupling with a locked configuration where the pipe cannot be released, therefore preventing accidental release of the pipe in use.

Throughout this disclosure, the term 'pipe coupling' may refer to an element which is able to receive and hold the end of a pipe. A pipe coupling may be used to connect two or more pipes together. The pipe coupling may connect pipes of different diameter or may connect pipes at different angles.

Throughout this disclosure, the term 'bore' may refer to a hollow part of a tube or other element even if the hollow part was not created by drilling or boring.

The term 'configured to' may be interpreted to be identical to and replaceable by the terms 'configured for' or 'suitable for'.

The gripping element may therefore be configured for engaging a surface of the pipe. In the same manner but expressed in an alternative way, the gripping element may be suitable for engaging a pipe.

Similarly, the pipe release element may be configured for disengaging the gripping element form the surface of the pipe. In the same manner but expressed in an alternative way, the pipe release element may be suitable for disengaging the gripping element from the surface of the pipe.

In the locked position, the release collar may not be moved axially. In the locked position, the pipe release element may also not be moved axially.

Axial movement of the release collar from a locked position to an unlocked position may be axial movement in a first direction.

Axial movement of the release collar from an unlocked position to a locked position may be axial movement in a second direction.

The first axial direction may be opposite to the second axial direction.

The first direction may be opposite a pipe insertion direction and the second direction may be in a pipe insertion direction.

Rotation of the rotatable sleeve may not cause rotation of the pipe release element.

Rotation of the rotatable sleeve may not cause axial movement of the pipe release element.

Axial movement of the release collar may not cause rotation of the pipe release element.

The pipe release element may not grip the pipe.

The surface of the pipe which the gripping element is configured to engage may be an outer surface of the pipe.

Axial rotation of the rotatable sleeve in a second direction may cause the release collar to move axially from the unlocked position to the locked position.

In some embodiments, this may allow the release collar to be moved from the unlocked position back to a locked position so that the pipe coupling can be reused.

The pipe release element may have a threaded outer surface which engages with a threaded inner surface of the release collar.

In some embodiments, this may result in the release collar being able to rotate and move axially with respect to the release element.

Throughout this disclosure, the term 'threaded surface' may refer to a fully threaded surface, partially threaded surface or interrupted threaded surface.

The release collar may be coupled to the rotatable sleeve such that the release collar rotates together with the rotatable sleeve.

In some embodiments, this may result in rotation of the rotatable sleeve causing rotation of the release collar.

The release collar may be coupled to the rotatable sleeve such that the release collar can move axially with respect to the rotatable sleeve.

In some embodiments, this may allow the release collar to be moved axially between the locked and unlocked positions.

The release collar may comprise a number of axial grooves or ridges to engage a number of axial ridges or grooves of the rotatable sleeve.

In some embodiments, this may allow the release collar to rotate together with the rotatable sleeve and allow it to move axially with respect to the rotatable sleeve.

When rotating the rotatable sleeve in a second direction, the rotatable sleeve may provide tactile feedback when the release collar is in a locked position.

In some embodiments, this allows a user to more easily determine when the release collar is in a locked position.

The rotatable sleeve may comprise a first axial ridge and the coupling body may comprises a second axial ridge arranged such that when rotating the rotatable sleeve in a second direction, the first axial ridge engages the second axial ridge to provide tactile feedback when the release collar is in a locked position.

In some embodiments, this may result in the user feeling a 'click' when the release collar is in a locked position.

When rotating the rotatable sleeve in a first direction, the rotatable sleeve may be prevented from further rotation when the release collar is in the unlocked position.

In some embodiments, this may allow a user to more easily determine when the release collar is in the unlocked position.

The rotatable sleeve may comprise a first axial ridge and the coupling body may comprise a third axial ridge arranged such that when rotating the rotatable sleeve in a first direction, the first axial ridge engages the third axial ridge to stop further rotation of the rotatable sleeve when the release collar is in the unlocked position.

The second and third axial ridges may be disposed adjacent to each other.

The coupling body may comprise a pair of second axial ridges disposed on opposite sides of the coupling body.

The coupling body may comprise a pair of third axial ridges disposed on opposite sides of the coupling body.

The pipe release element may be coupled to the coupling body to prevent rotational movement of the pipe release element with respect to the coupling body.

Throughout this disclosure, the term 'coupled to' may refer to two elements being directly coupled together or indirectly coupled together via a third element.

In some embodiments, this prevents the pipe release element from rotating together with the rotatable sleeve.

The pipe release element may be coupled to the coupling body to allow axial movement of the pipe release element with respect to the coupling body.

In some embodiments, this may allow the pipe release element to move axially to disengage the gripping element from the surface of the pipe.

The pipe release element may comprise a number of axially aligned legs.

The axially aligned legs may extend in a pipe insertion direction.

The gripping element may be disposed on the legs of the pipe release element.

The gripping element may comprise a number of teeth disposed on the legs of the pipe release element.

The teeth may extend radially inwardly to engage an outer surface of the pipe.

The teeth may be inclined in a pipe insertion direction.

In some embodiments, this may result in the teeth biting into the surface of the pipe to better grip the pipe.

Upon axial movement of the pipe release element in a pipe insertion direction, the legs of the pipe release element may expand radially outwards so as to disengage the teeth of the gripping element from the surface of the pipe.

The gripping element may be separate from the pipe release element.

The gripping element may be disposed adjacent the pipe release element.

The pipe release element and the gripping element may be disposed sequentially in a pipe insertion direction.

In some embodiments, this may result in axial movement of the pipe release element causing the gripping element to disengage from the surface of the pipe.

The gripping element may comprise a number of teeth extending radially inwardly to engage with an outer surface of the pipe.

In some embodiments, this may result in the teeth gripping the pipe to prevent movement of the pipe.

The gripping element may be in the form of a gripping ring. The entire gripping ring may be made from a metallic material or only the teeth may be made from a metallic material.

The teeth may be inclined in a pipe insertion direction.

In some embodiments, this may result in the teeth biting into the surface of the pipe to better grip the pipe.

At least one of the teeth may comprise a first strengthening element, preferably a first flange, which extends along the majority of the length of the at least one of the teeth.

The first strengthening element may be disposed along a first edge of the at least one of the teeth.

The at least one of the teeth may comprise a second strengthening element, preferably a second flange, which extends along the majority of the length of the at least one of the teeth.

The second strengthening element may be disposed along a second edge of the at least one of the plurality of teeth.

The pipe release element may have an outer surface which tapers in the direction of pipe insertion.

In some embodiments, this may result in the pipe release element more easily disengaging the gripping element from the surface of the pipe.

The tapered surface of the pipe release element may engage the teeth of the gripping element upon axial movement of the pipe release element in a pipe insertion direction to disengage the teeth of the gripping element from the surface of the pipe.

The pipe release element and the gripping element may be arranged sequentially in a pipe insertion direction in a chamber defined by the rotatable sleeve.

In some embodiments, this may result in pipe release mechanism being protected from external influences by the rotatable sleeve.

The pipe coupling may further comprise a connecting element for connecting the coupling body to the pipe release element.

The connecting element may be coupled to the coupling body to prevent rotation of the connecting element with respect to the coupling body.

The connecting element may be coupled to the coupling body to prevent axial movement of the connecting element with respect to the coupling body.

The coupling body may comprise a number of teeth or slots to engage a number of corresponding slots or teeth of the connecting element.

The pipe release element may be coupled to the connecting element to prevent rotation of the pipe release element.

The pipe release element may be coupled to the connecting element to allow axial movement of the pipe release element with respect to the connecting element.

The pipe release element may comprise a number of axial grooves or ridges to engage a number of corresponding axial ridges or grooves of the connecting element.

The connecting element may limit the axial movement of the pipe release element in a direction opposite the pipe insertion direction.

In some embodiments, this may prevent the pipe release element from accidentally being withdrawn from the pipe coupling.

The pipe release element, the connecting element and the gripping element may be disposed sequentially in a pipe insertion direction in a chamber defined by the rotatable sleeve.

In some embodiments, this may result in the pipe release mechanism being protected from external influences by the rotatable sleeve.

The pipe coupling may further comprise a sealing element for sealing a space between the pipe coupling and an outer surface of the pipe.

In some embodiments, this may prevent fluid leakage in the pipe coupling.

The pipe release element, the connecting element, the gripping element and the sealing element may be disposed sequentially in a pipe insertion direction in a chamber defined by the rotatable sleeve.

The pipe coupling may further comprise a spacer element disposed between the gripping element and the sealing element.

The bore may be tubular and the pipe release element may be a tubular pipe release element.

The coupling body may have a first shoulder for limiting the pipe insertion length.

The first shoulder may have a number of radially disposed ridges for interacting with a pipe insertion end.

In some embodiments, this may result in a user being able to determine that the pipe end has been inserted fully by rotating the pipe and receiving tactile feedback.

The pipe coupling may be provided as a kit of parts to be assembled.

Specifically, a pipe coupling assembly may be provided for receiving, holding and releasing a pipe. The pipe coupling assembly may comprise a coupling body having a bore with a geometric axis into which a pipe can be inserted in a pipe insertion direction. The pipe coupling further may comprise a rotatable sleeve which is arrangeable at least partially around the coupling body and which is rotatable around the axis of the bore with respect to the coupling body. The pipe coupling further comprises a gripping element configured to engage a surface of the pipe. The pipe coupling further comprises a pipe release element configured to disengage the gripping element from the surface of the pipe upon axial movement of the pipe release element and a release collar which is able to be coupled to an end of the rotatable sleeve. In the assembled condition, axial rotation of the rotatable sleeve in a first direction causes the release collar to move axially from a locked position to an unlocked position. In the unlocked position, the release collar can be moved axially in a pipe insertion direction to cause the pipe release element to disengage the gripping element from the surface of the pipe.

In a second aspect of the present invention, there is disclosed a method of assembling a pipe coupling for receiving, holding and releasing a pipe. The method comprises coupling a release collar to the end of a rotatable sleeve. The method further comprises coupling a pipe release element to the release collar to produce a first subassembly, wherein the rotatable sleeve and the release collar are rotatable with respect to the pipe release mechanism. The method further comprises inserting a gripping element into a coupling body comprising a bore with a geometric axis into which a pipe can be inserted in a pipe insertion direction to produce a second subassembly. The method even further comprises attaching the first subassembly to the second subassembly to produce a pipe coupling in which axial rotation of the rotatable sleeve in a first direction causes the release collar to move axially from a locked position to an unlocked position. In the unlocked position, the release collar can be moved axially in a pipe insertion direction to cause the pipe release element to disengage the gripping element from the surface of the pipe.

In some embodiments, this may result in a pipe coupling which is easy to assemble.

Coupling the pipe release element to the release collar may comprise threadably engaging a threaded outer surface of the pipe release element with a threaded inner surface of the release collar.

Before coupling the pipe release element to the release collar, the pipe release element may be coupled to a connecting element.

The pipe release element may be coupled to the connecting element to prevent rotation of the pipe release element with respect to the connecting element.

The pipe release element may be coupled to the connecting element to allow axial movement of the pipe release element with respect to the connecting element.

Before inserting the gripping element into the coupling body, a sealing element may be inserted into the bore of the coupling body.

After the sealing element is inserted into the coupling body, a spacer element may be inserted into the bore of the coupling body.

In a third aspect of the present invention, there is provided a gripping element for a holding a pipe in a pipe coupling. The gripping element comprises an annular ring and a plurality of teeth for engaging an outer surface of the pipe. The plurality of teeth extend radially inwardly from the annular ring and are inclined at an angle with respect to the annular ring. At least one of the plurality of teeth comprises a first strengthening element which extends along the majority of the length of the at least one of the plurality of teeth.

In some embodiments, this may result in a gripping element which provides a stronger hold on the pipe.

The first strengthening element may be a first flange.

The annular ring may be in the form of a planar ring.

There may be a gap between the end of the first flange and the annular ring.

In some embodiments, this may result in a gripping element which provides a stronger hold on the pipe without increasing the force required to insert the pipe into the pipe coupling.

The at least one of, preferably each of, the plurality of teeth may be in the shape of a trapezoid.

The width of the at least one of, preferably each of, the plurality of teeth may taper in a direction radially inwards from a wider width to a narrower width.

The first flange may be disposed along a first edge of the at least one of the plurality of teeth.

The first flange may be disposed at an angle of 45 to 120 degrees, preferably at an angle of 60 to 90 degrees, to the at least one of the plurality of teeth.

The at least one of the plurality of teeth may comprise a second strengthening element which extends along the majority of the length of the at least one of the plurality of teeth.

The second strengthening element may be a second flange.

There may be a gap between the end of the second flange and the annular ring.

The second flange may be disposed along a second edge of the at least one of the plurality of teeth.

The second flange may be disposed at an angle of 15 to 90 degrees, preferably at an angle of 45 to 90 degrees, to the at least one of the plurality of teeth.

Each of the plurality of teeth may comprise the first strengthening element.

Each of the plurality of teeth may comprise the second strengthening element.

The gripping element may be made from a metal.

In a fourth aspect of the present invention there is provided a coupling body for receiving a pipe in a pipe coupling. The coupling body comprises a bore with a geometric axis into which a pipe can be inserted in a pipe insertion direction, a first annular internal shoulder within the bore, a first annular external shoulder for engaging with a rotatable sleeve. The first annular external shoulder is offset from the first annular internal shoulder along the axis of the bore. The coupling body further comprises an elongate annular portion which connects the first annular internal shoulder with the first annular external shoulder.

In some embodiments this may result in a pipe coupling which is more robust and secure and easier to assemble.

The first annular internal shoulder may be suitable for receiving a sealing element or a gripping element.

The coupling body may further comprise a second annular internal shoulder for accommodating an end of the pipe.

The coupling body may further comprise a third annular internal shoulder for accommodating a spacer element.

The third annular internal shoulder may be axially aligned with the first annular external shoulder.

A pipe coupling for receiving, holding and releasing a pipe may comprise the coupling body, a rotatable sleeve which is arranged at least partially around the coupling body and which is rotatable around the axis of the bore with respect to the coupling body. The rotatable sleeve may have an annular groove which is engaged with the second annular external shoulder of the coupling body. The pipe coupling may further comprise a gripping element configured to engage a surface of the pipe. The pipe coupling may further comprise a pipe release element configured to disengage the gripping element from the surface of the pipe upon axial movement of the pipe release element.

The pipe coupling may further comprise a sealing element for sealing a space between the pipe coupling and an outer surface of the pipe, wherein the sealing element is in contact with the first annular internal shoulder of the coupling body.

The pipe coupling may further comprise a spacer element which is in contact with the third annular internal shoulder of the coupling body and the gripping element.

The pipe coupling may further comprise a release collar coupled to an end of the rotatable sleeve.

Axial rotation of the rotatable sleeve in a first direction may cause the release collar to move axially from a locked position to an unlocked position In the unlocked position, the release collar may be moved axially in the pipe insertion direction to cause the pipe release element to disengage the gripping element from the surface of the pipe.

BRIEF DESCRIPTION OF THE DRAWINGS

To enable better understanding of the present disclosure, and to show how the same may be carried into effect, reference will now be made, by way of example only, to the accompanying drawings, in which:

FIG. 4 shows cross-sectional sequence of the pipe release mechanism of the pipe coupling of FIG. 1;

DETAILED DESCRIPTION

Figure 1:
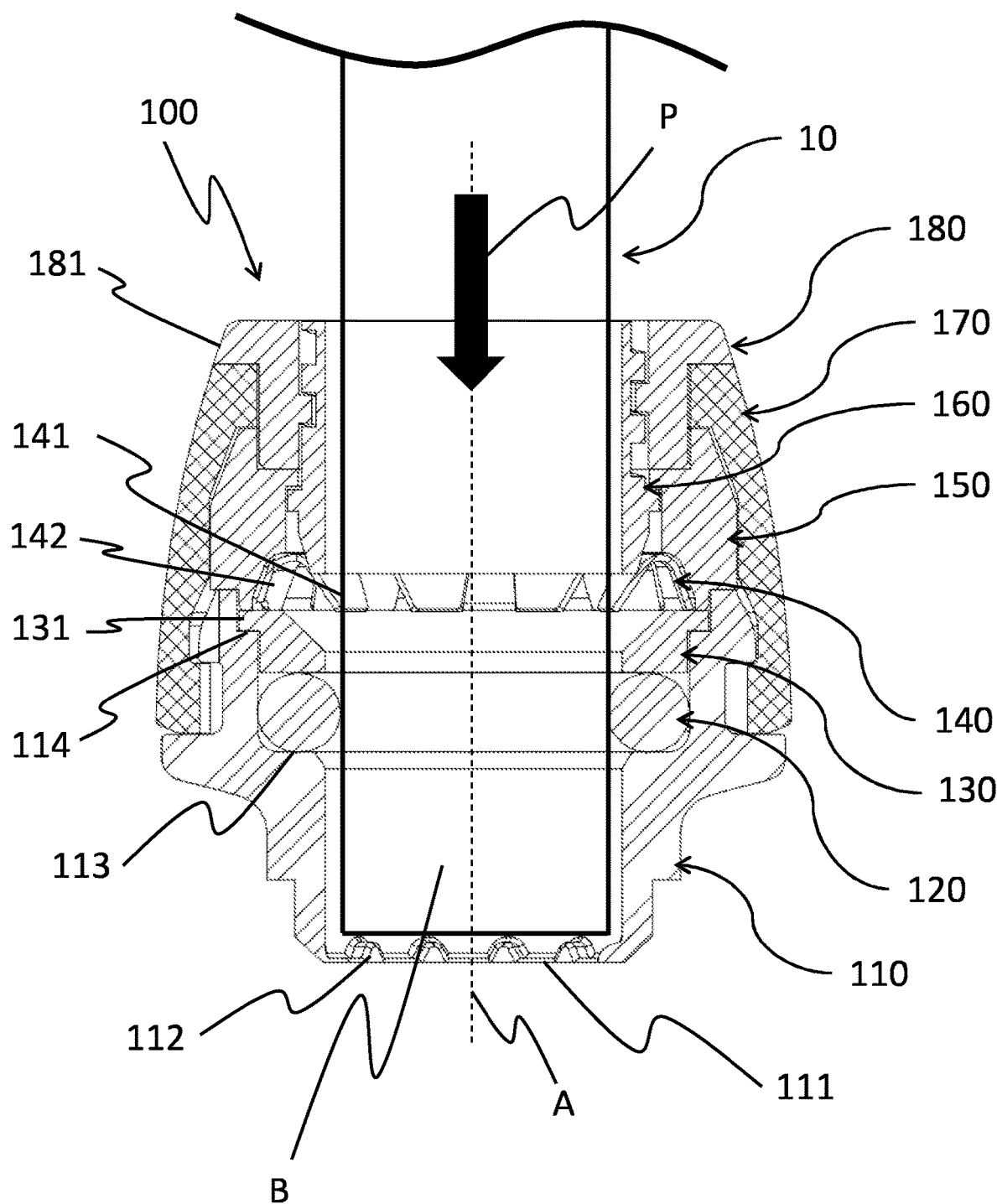
FIG. 1 shows a cross-sectional view of a pipe coupling according to an embodiment of the present invention.

FIG. 1 shows a cross-sectional view of a pipe coupling 100 in a locked configuration with a pipe 10 inserted into the pipe coupling 100. The pipe coupling 100 comprises a coupling body 110, a sealing ring 120, a spacer element 130, a gripping element 140, a connecting element 150, a pipe release element 160, a rotatable sleeve 170 and a release collar 180.

Figure 2:
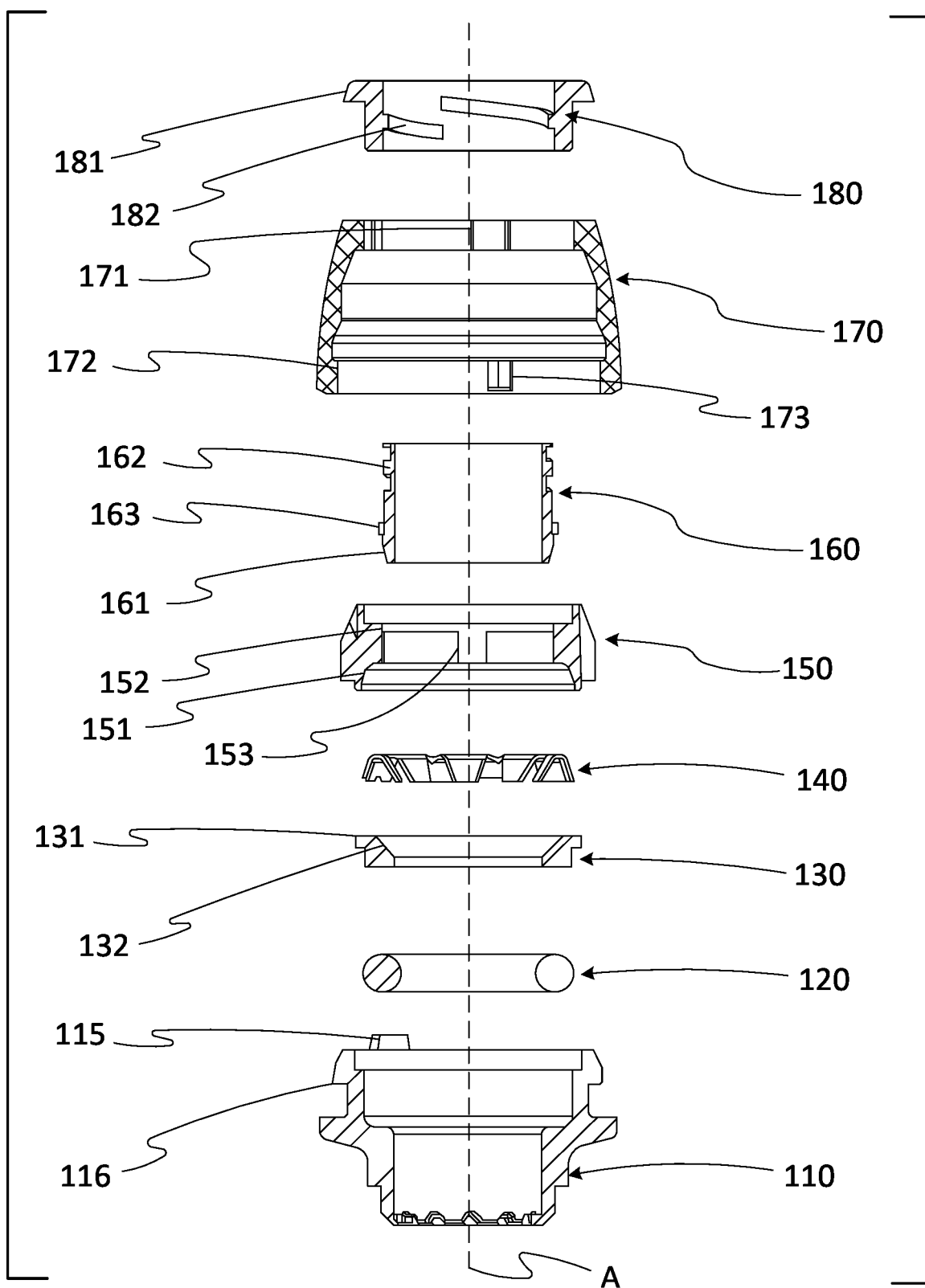
FIG. 2 shows a cross-sectional exploded view of the pipe coupling of FIG. 1.
Figure 3A:
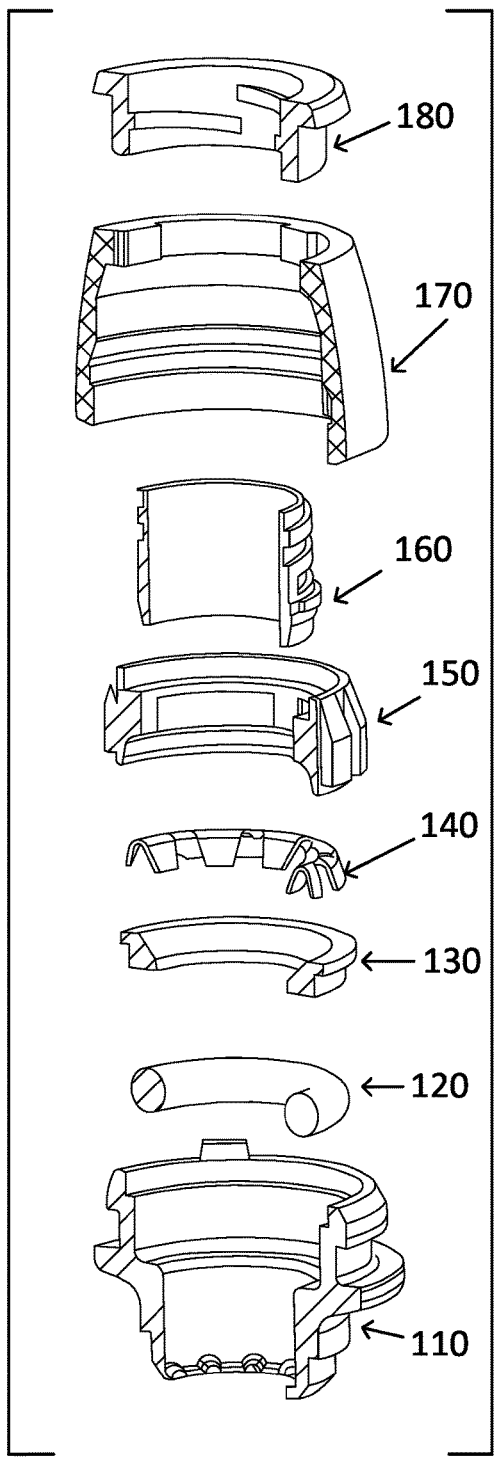
FIG. 3A shows an isometric cross-sectional exploded view of the pipe coupling of FIG. 1.
Figure 3B:
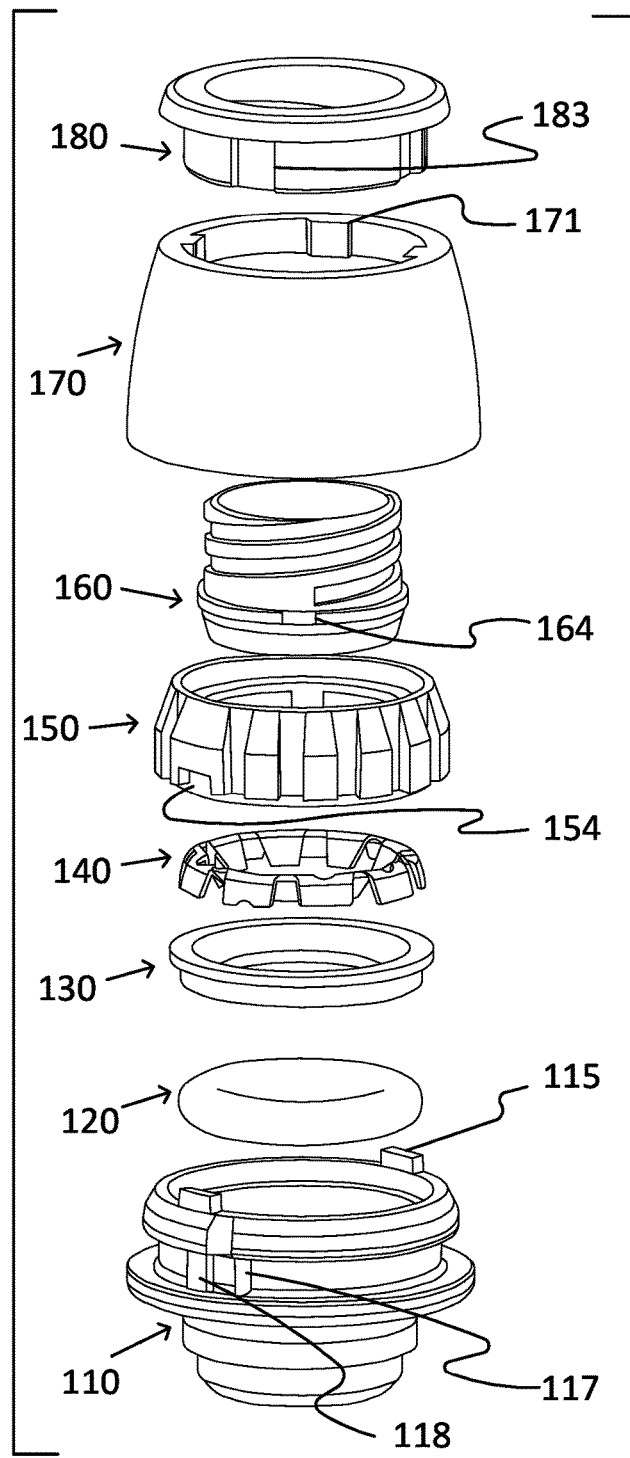
FIG. 3B shows an isometric exploded view of the pipe coupling of FIG. 1.

FIG. 2 shows a cross-sectional exploded view of the pipe coupling 100 which allows the individual elements of the pipe coupling 100 to be more clearly distinguished. FIGS. 3A and 3B show isometric exploded views of the pipe coupling 100 which further show some features which are not visible in the cross-sectional views of FIG. 1 and FIG. 2.

The structure of the pipe coupling will be explained with reference to FIGS. 1, 2 and 3, as some features are visible only in the exploded or isometric view of FIGS. 2 and 3.

The coupling body 110 defines a bore B into which a pipe 10 can be inserted in a pipe insertion direction P. The bore B has a central geometric axis A. The coupling body 110 has a first shoulder 111, which is an internal shoulder, for limiting the pipe insertion length. When the pipe 10 is inserted into the pipe coupling 100 in the pipe insertion direction P, the end of the pipe 10 will come into contact with the first shoulder 111 which will prevent further movement of the pipe 10.

The first shoulder 111 comprises a number of radially disposed ridges 112. These ridges 112 may interact with a sleeve insert (not shown) attached to the end of the pipe 10 which has corresponding ridges and/or grooves. When inserting the pipe 10 into the pipe coupling 100, a user can confirm that the pipe 10 has been inserted sufficiently far and that the pipe end is in contact with the first shoulder 111 by rotating the pipe 10 in the pipe coupling 100. This will result in the ridges and/or grooves of the pipe sleeve attached to the pipe end interacting with the ridges 112 of the first shoulder 111 to provide tactile feedback to the user in the form of clicks.

The coupling body 110 further defines a second shoulder 113 and a third shoulder 114, which are also internal. The second shoulder 113 is in contact with and supports the sealing element 120. The sealing element 120 is in the form of an annular ring and made from an elastic material such as rubber. The sealing element 120 is configured to contact the outside surface of the pipe 10 inserted into the pipe coupling 100 so as to seal the space between the outside surface of the pipe 10 and the pipe coupling 100. The sealing element 120 prevents any fluid which is passing through the pipe 10 from leaking through the pipe coupling 100.

A spacer element 130 is disposed on top of the sealing element 120. The spacer element has a flange 131 which contacts the third shoulder 114 of the coupling body 110. The spacer element 130 separates the sealing element 120 and the gripping element 140 from each other and provides a stable platform to support the gripping element 140.

The gripping element 140 is an annular metallic gripping ring, made from steel for example, which has a set of teeth 141 which extend radially inwardly and which are inclined in a pipe insertion direction P. This set of teeth 141 engage with the outer surface of the pipe 10 which is inserted into the pipe coupling 100. Because the teeth 141 are inclined in a pipe insertion direction P, they will bite into the outer surface of the pipe 10 when a retraction force opposite to the pipe insertion direction P is applied to the pipe 10, thus gripping the pipe 10 even harder and preventing withdrawal of the pipe 10. The gripping element 140 also comprises a set of legs 142 which extend radially outwardly and are also inclined in a pipe insertion direction P. The legs 142 are in contact with the spacer element 130 to anchor the gripping element 140 in place. The spacer element has a circular inner bevel 132 to provide space for the teeth 141 to bend when gripping or releasing the pipe 10.

A connecting element 150 is disposed adjacent the gripping element 140 and connects the pipe release element 160 to the coupling body 110. The connecting element 150 has an internal sloping surface 151 at the end which is in contact with the gripping element 140. The internal sloping surface 151 extends at the same angle from the axis A as the legs 142 of the gripping element. The connecting element 150 therefore creates a groove for accommodating the legs 142 of the gripping element 140 to anchor the gripping element 140 and prevent axial movement of the gripping element 140. This allows the pipe 10 to be gripped tightly by the gripping element 140.

The pipe release element 160 is connected to the coupling body 110 through the connecting element 150 in such a way as to prevent rotation of the pipe release element 160 with respect to the coupling body 110 but allow axial movement of the pipe release element 160 with respect to the coupling body 110. To that end, the coupling body 110 comprises a number of axially extending tabs 115 which fit into a number of corresponding slots 154 (see FIG. 3B) of the connecting element 150 to prevent rotational movement of the connecting element 150 with respect to the coupling body 110. Axial movement of the connecting element 150 with respect to the coupling body 110 is prevented by the rotatable sleeve 170 which is connected to the coupling body 110 and holds the connecting element 150 in place.

As shown in FIG. 2 and FIG. 3A, the connecting element 150 further comprises a number of axial ridges 153 which engage with a number of axial grooves 164 of the pipe release element 160 so as to prevent rotational movement of the pipe release element 160 with respect to the connecting element 150 and the coupling body 110 but allow axial movement of the pipe release element 160 with respect to the connecting element 150 and the coupling body 110. A circumferential ridge 152 on the inside surface of the connecting element 150 engages with a corresponding circumferential ridge 163 on the outside surface of the pipe release element 160 to limit the axial movement of the pipe release element 160 in a direction opposite the pipe insertion direction P. The axial groove 164 may be disposed in the circumferential ridge 152. Rotation of the rotatable sleeve 170 does not cause rotation or axial movement of the pipe release element 160.

The pipe release element 160 has a tubular shape and a tapered outer surface 161 on one end which tapers in a pipe insertion direction P. Upon axial movement of the pipe release element 160 in a pipe insertion direction P, the tapered outer surface 161 engages the teeth 141 of the gripping element 140 and bends them radially outwards to disengage the teeth 141 from the surface of pipe 10, allowing the pipe 10 to be removed from the pipe coupling 100. The pipe release element 160 itself does not grip the pipe 10.

The pipe release element 160 has a threaded outer surface 162 on the other end. The threaded outer surface 162 engages with a threaded inner surface 182 of the release collar 180 such that rotation of the release collar 180 with respect to the pipe release element 160 results in axial movement of the release collar 180 with respect to the pipe release element 160.

The release collar 180 is coupled to the rotatable sleeve 170 in such a way that the release collar 180 can move axially with respect to the rotatable sleeve 170 but cannot rotate with respect to the rotatable sleeve 170. Specifically, the rotatable sleeve 170 comprises a number of axial ridges 171 which engage with a number of corresponding axial grooves 183 to prevent rotation of the release collar with respect to the rotatable sleeve 170 but allow axial movement of the release collar 180 with respect to the rotatable sleeve 170. The release collar 180 also comprises an external annular flange 181 which provides a surface for a user of the pipe coupling to move the release collar 180 axially in a pipe insertion direction P to cause the pipe release element 160 to move axially and disengage the gripping element 140 from the surface of the pipe 10.

The rotatable sleeve 170 is coupled to the coupling body 110 to allow axial rotation of the rotatable sleeve 170 about axis A with respect to the coupling body 110. To that end, the rotatable sleeve 170 comprises an inner annular shoulder or ridge 172 which engages with an outer annular shoulder or ridge 116 of the coupling body 110. Since the rotatable sleeve 170 is coupled to the release collar 180, axial rotation of the rotatable sleeve 170 with respect to the coupling body 110 will result in axial rotation of the release collar with respect to the coupling body 110 and axial movement of the release collar 180 with respect to the coupling body 110, the rotatable sleeve 170 and the pipe release element 160.

The rotatable sleeve 170 is an outer sleeve which is disposed over at least part of the coupling body 110, at least part of the sealing ring 120, the spacer element 130, the gripping element 140, the connecting element 150, at least part of the pipe release element 160 and at least part of the release collar 180. The rotatable sleeve 170 forms a chamber in which these elements are disposed. The rotatable sleeve 170 therefore protects the internal release mechanism from external influences, resulting in a durable and safe to use pipe coupling 100.

FIG. 1 shows the pipe coupling 100 in a locked configuration where the release collar 180 is in a locked position. This means that the external annular flange 181 of the release collar 180 is in contact with the end of the rotatable sleeve 170. In this configuration, the release collar 180 cannot be moved axially in a pipe insertion direction P to cause the pipe release element 160 to disengage the gripping element 140 from the surface of the pipe 10 to release the pipe 10. By rotating the rotatable sleeve 170, the release collar 180 can move axially in a direction opposite the pipe insertion direction P to an unlocked position, where the annular flange 181 does not contact the rotatable sleeve 170. This corresponds to an unlocked configuration of the pipe coupling 100. The angle of rotation of the rotatable sleeve 170 which moves the release collar 180 from an unlocked position to a locked position, and vice versa, is preferably 180 degrees, although other angles are also possible. The release mechanism is explained in more detail with reference to FIGS. 4 and 5 below.

In order for a user of the pipe coupling 100 to determine when the pipe coupling 100 is in a locked position and when it is in an unlocked position, the rotatable sleeve 170 provides tactile feedback to the user. Specifically, when rotating the rotatable sleeve 170 in a first direction, which causes the release collar 180 to move axially in a direction opposite to the pipe insertion direction P from a locked position to an unlocked position, the user will feel a 'click' when the release collar 180 leaves the locked position. Furthermore, when the release collar 180 is in an unlocked position, further rotation of the rotatable sleeve 170 in a first direction is prevented. When rotating the rotatable sleeve in a second direction, which causes the release collar 180 to move axially in a pipe insertion direction P from an unlocked to a locked position, the user will feel a 'click' when the release collar 180 is in a locked position. Further rotation in a second direction is prevented when the release collar 180 is in the locked position. To that end, the rotatable sleeve 170 comprises a pair of first axial ridges 173 (only one visible in FIG. 2) which are disposed on opposite sides of the rotatable sleeve 170. The coupling body 110 comprises a pair of second axial ridges 117 (only one visible in FIG. 3B) disposed on opposite sides of the coupling body 110 and a pair of third axial ridges 118 (only one visible in FIG. 3B) also disposed on opposite sides of the coupling body 110. The second axial ridges 117 and the third axial ridges 118 are disposed adjacent to one another. The second axial ridges 117 are smaller and rounder in shape and are configured to provide tactile feedback in the form of a 'click'. The third axial ridges 118 are larger and rectangular in shape and are configured to prevent further rotation of the rotatable sleeve 170 once the release collar 180 is in the locked or unlocked position. The second axial ridges 117 are arranged such that when rotating the rotatable sleeve 170 in the second direction, the first axial ridges 173 engage the second axial ridges 117 to provide tactile feedback when the release collar 180 is in a locked position. The first axial ridges 173 also engage the second axial ridges 117 when the rotatable sleeve 170 is rotated in the first direction to provide tactile feedback when the release collar is no longer in a locked position. The third axial ridges 118 engage the first axial ridges 173 when the rotatable sleeve 170 is rotated in the first direction to prevent further rotation of the rotatable sleeve 170 when the release collar 180 is in the unlocked position. The third axial ridges 118 also engage the first axial ridges 173 when the rotatable sleeve 170 is rotated in the second direction to prevent further rotation of the rotatable sleeve 170 once the release collar 180 is in the locked position.

The tactile feedback allows a user of the pipe coupling to more easily and intuitively determine when the pipe coupling is in a locked and unlocked configuration thus simplifying the installation process. Furthermore, an easy and accurate determination of when the pipe coupling 100 is in the locked configuration helps to prevent accidental release of the pipe during use.

FIG. 4 illustrates a sequence of the pipe release mechanism for the pipe coupling 100 described above with reference to FIGS. 1 to 3.

A pipe is connected to the pipe coupling 100 by simply inserting the pipe 10 into the coupling 100 in the pipe insertion direction P. The teeth 141 of the gripping element 140 will engage the outer surface of the pipe 10 to prevent it from moving in a direction opposite the pipe insertion direction P. The sealing element 120 contacts the outer surface of the pipe 10 and forms a fluid tight seal. The pipe may be inserted into the pipe coupling 100, preferably, when the pipe coupling 100 is in the locked configuration but may also be inserted when the pipe coupling 100 is in the unlocked configuration.

FIG. 4A shows a cross-sectional view of the pipe coupling 100 in a locked configuration. In the locked configuration the release collar 180 is in a locked position where the annular flange 181 is contacting the rotatable sleeve 170. In the locked position, the release collar 180 cannot move axially in a pipe insertion direction P and therefore the pipe release element 160 cannot disengage the gripping element 140 from the surface of the pipe to release the pipe.

FIG. 4B shows a cross sectional view of the pipe coupling 100 in an unlocked configuration. In the unlocked configuration, the release collar 180 is in an unlocked position in which the annular flange 181 is axially displaced from the rotatable sleeve 170. In order to change the pipe coupling from the locked configuration of FIG. 4A to the unlocked configuration shown in FIG. 4B, a user of the pipe coupling 100 rotates the rotatable sleeve 170 in a first direction with respect to the coupling body 110. The release collar 180 is coupled to the rotatable sleeve 170 such that it will rotate together with the rotatable sleeve 170. Rotation of the rotatable sleeve 170 in a first direction therefore causes rotation of the release collar 180 in a first direction. The release collar 180 is threadably coupled to the pipe release element 160 which in turn is coupled to the coupling body 110 through the connecting element 150 such that it does not rotate with respect to the coupling body 110. Rotation of the release collar 180 in a first direction will therefore cause the release collar 180 to move axially in a direction opposite the pipe insertion direction P. After a rotation angle of 180 degrees, the first axial ridges 173 will engage the third axial ridges 118 of the coupling body 110 to stop further rotation and thus indicating to a user that the pipe coupling 100 is now in the unlocked configuration.

In the unlocked configuration, the user of the pipe coupling 100 can axially move the release collar 180 in a pipe insertion direction P by pressing on the annular flange 181. Because the release collar 180 is threadably coupled to the pipe release element 160 and the pipe release element 160 is able to move axially in a pipe insertion direction P, axial movement of the release collar 180 in a pipe insertion direction P will cause axial movement of the pipe release element 160 in a pipe insertion direction P. The pipe release element is disposed adjacent the gripping element 140 whose teeth 141 are engaging the outer surface of the pipe 10 inserted into the pipe coupling 100. Axial movement of the pipe release element in the pipe insertion direction P causes the tapered outer surface 161 to engage the teeth 141 of the gripping element 140 to push the teeth 141 radially outwards and disengage them from the surface of the pipe.

FIG. 4C shows the pipe coupling 100 in the releasing configuration, where the release collar 180 and the pipe release element 160 are moved axially in a pipe insertion direction P. The pipe release element 160 engages the teeth 141 of the gripping element 140 to disengage them from the surface of the pipe 10. The pipe 10 may then be pulled out of the pipe coupling 100. The pipe coupling 100 automatically returns to the unlocked configuration when the user stops pressing on the annular flange 181 of the release collar 180, as the teeth 141 of the gripping element 140 have a restoration force which pushes the pipe release element 160 and the release collar 180 back to their position in the unlocked configuration.

By rotating the rotatable sleeve 170 in a second direction, the release collar 180 will move axially in a pipe insertion direction P to its locked position. The first axial ridges 173 of the rotatable sleeve 170 will engage the second axial ridges 117 of the coupling body 110 to provide tactile feedback when the release collar 180 is in a locked position. The pipe coupling 100 is now in a locked configuration and may be reused by inserting a different pipe into the pipe coupling 100.

FIG. 5 shows a sequence of the lock and unlock mechanism of pipe coupling 100 from an external isometric view. Externally, only the coupling body 110, the rotatable sleeve 170 and the release collar 180 can be seen.

Figure 5C:
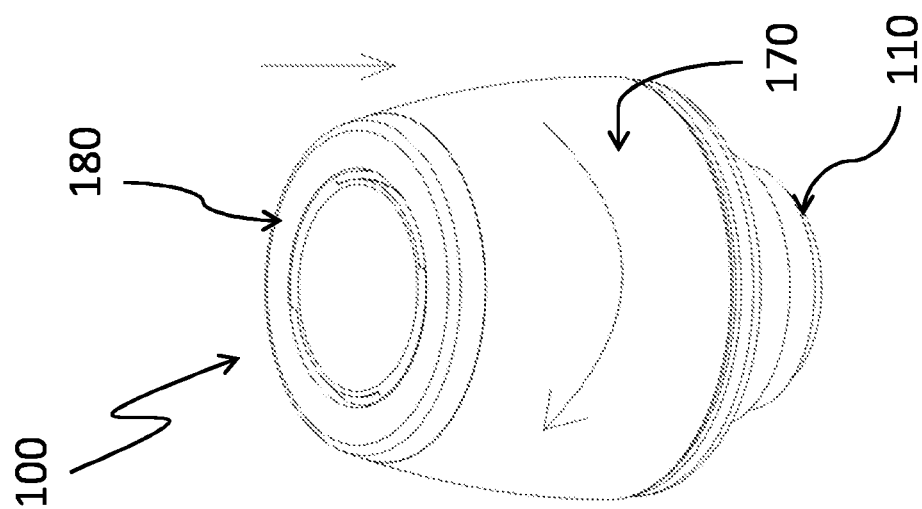
FIG. 5 shows an isometric view of a sequence of the locking and unlocking mechanism of the pipe coupling of FIG. 1.
Figure 5B:
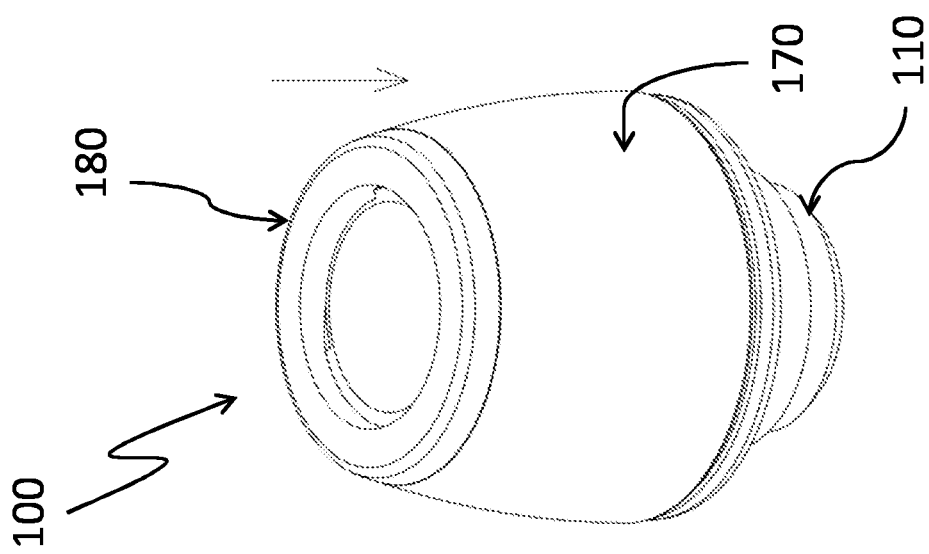
Figure 5A:
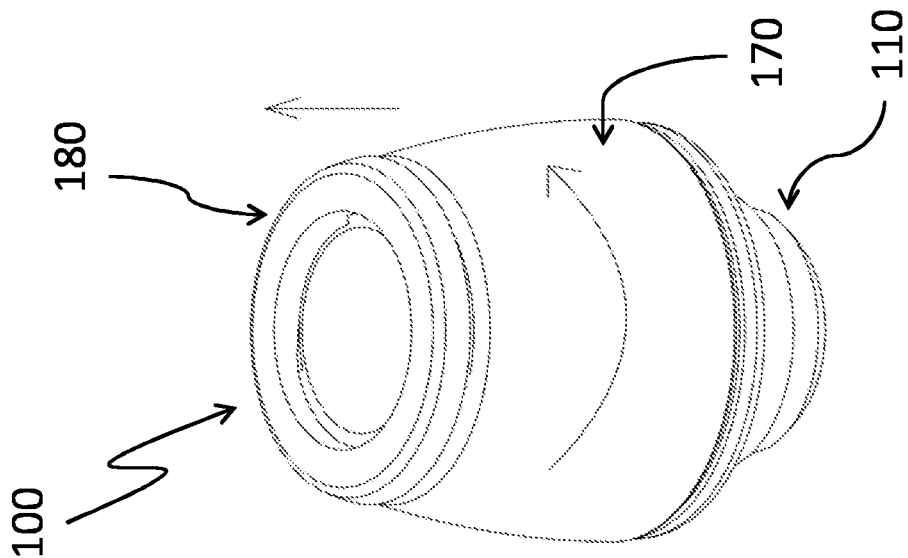

FIG. 5A shows the pipe coupling 100 in the unlocked configuration corresponding to FIG. 4B. By rotating the rotatable sleeve 170 in a first direction, the release collar 180 moves axially to the unlocked position where it is axially displaced from the rotatable sleeve 170. A user of the pipe coupling 100 can make a quick and easy visual indication of whether the pipe coupling 100 is in a locked or an unlocked configuration by looking at the position of the release collar 180. This helps to ensure that the pipe coupling 100 is in a locked position during use to prevent accidental release of the pipe.

FIG. 5B shows the pipe coupling in the releasing configuration corresponding to FIG. 4C, where the release collar 180 is axially depressed in a pipe insertion direction P. This causes the pipe release element 160 to move axially in a pipe insertion direction P and disengage the gripping element 140 from the surface of the pipe to allow the pipe to be pulled out. When the user stops depressing the release collar 180, the release collar 180 returns to the unlocked position.

FIG. 5C shows the pipe coupling in the locked configuration corresponding to FIG. 4A. By rotating the rotatable sleeve in a second direction, the release collar will move axially in a pipe insertion direction P until the annular flange 181 contacts the end of the rotatable sleeve and the release collar 180 is in a locked position. Tactile feedback is given to the user when the pipe coupling is in the locked configuration. The release collar 180 cannot be depressed and the pipe cannot be released in this configuration, preventing accidental release of the pipe during use.

Figure 6:
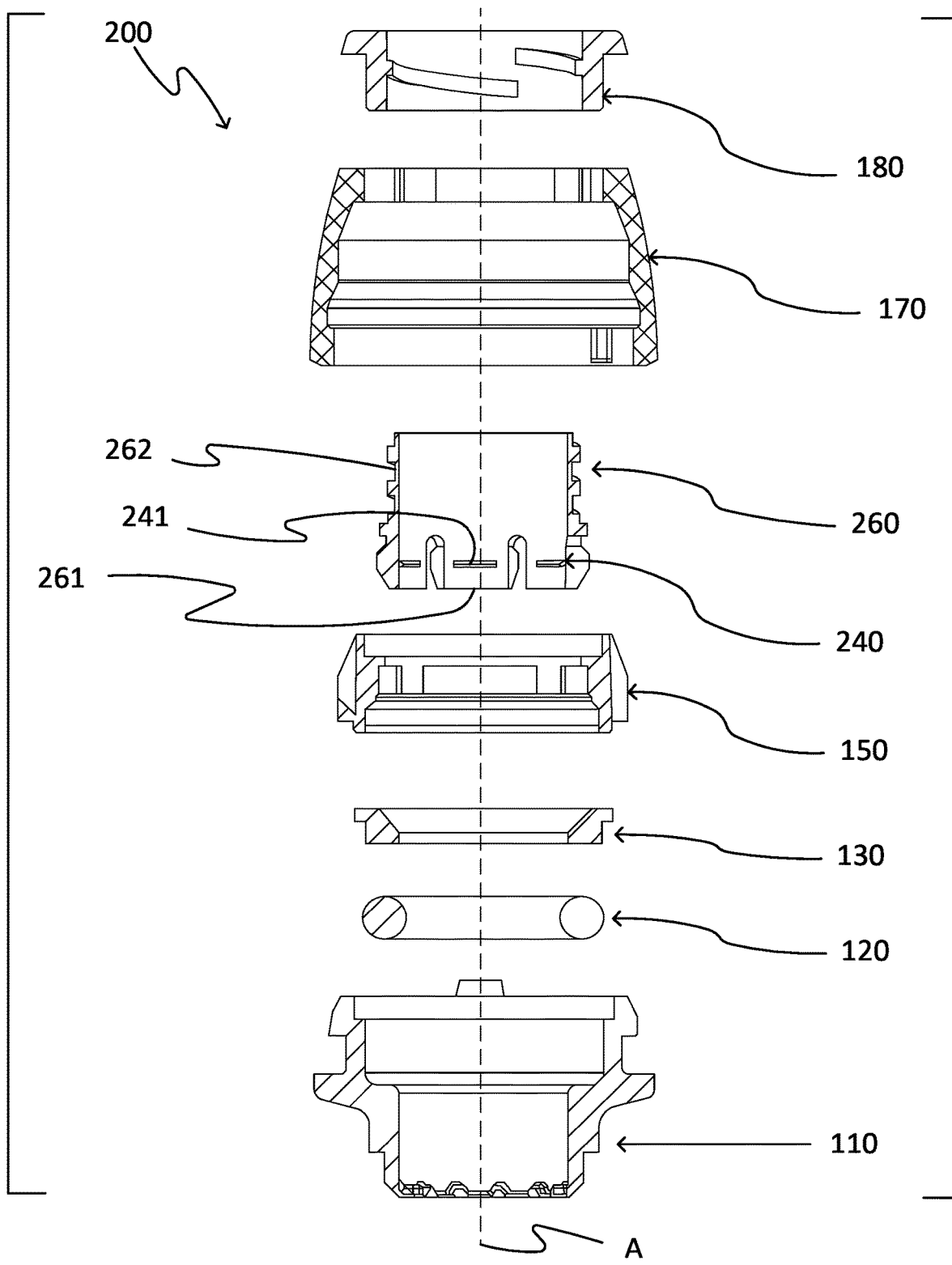
FIG. 6 shows a cross-sectional exploded view of another pipe coupling according to a second embodiment of the present invention.

FIG. 6 shows an exploded cross-sectional view of an alternative second embodiment of a pipe coupling 200. The pipe coupling 200 comprises a coupling body 110, a sealing element 120, a spacer element 130, a connecting element 150, a gripping element 240, a pipe release element 260, a rotatable sleeve 170 and a release collar 180.

The coupling body 110, sealing element 120, spacer element 130, connecting element 150, rotatable sleeve 170 and release collar 180 are the same as the ones described above with reference to FIGS. 1 to 5 and the same reference numerals indicate the same elements.

Pipe coupling 200 differs from pipe coupling 100 in that the pipe release element 260 comprises a number of legs 261 extending axially in a pipe insertion direction. The gripping element 240 is disposed on the inside surface of the legs in the form of teeth 241, which can be made of a metal or plastic, extending radially inwardly. The teeth 241 may be inclined in a pipe insertion direction or may not be inclined and extend straight radially inwards.

Similarly to the pipe release element 160 of pipe coupling 100, the pipe release element 260 also has a threaded outer surface 262 which engages with a threaded inner surface 182 of the release collar 180.

Figure 7A:
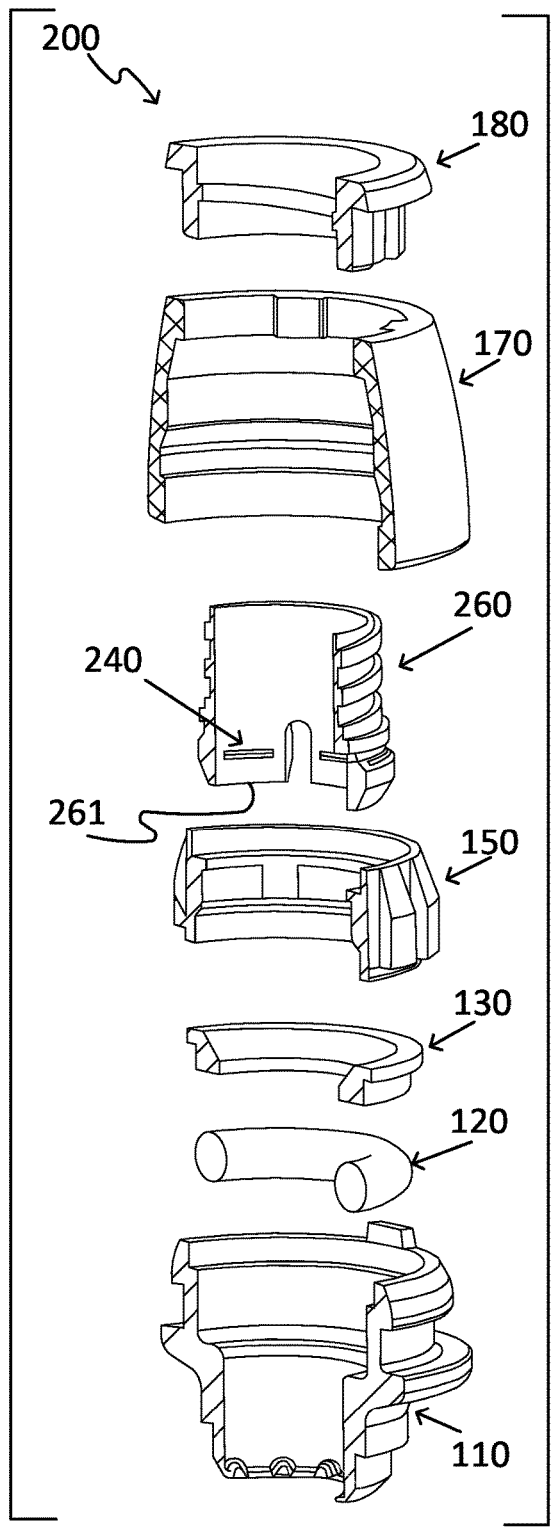
FIG. 7A shows an isometric cross-sectional exploded view of the pipe coupling of FIG. 6.
Figure 7B:
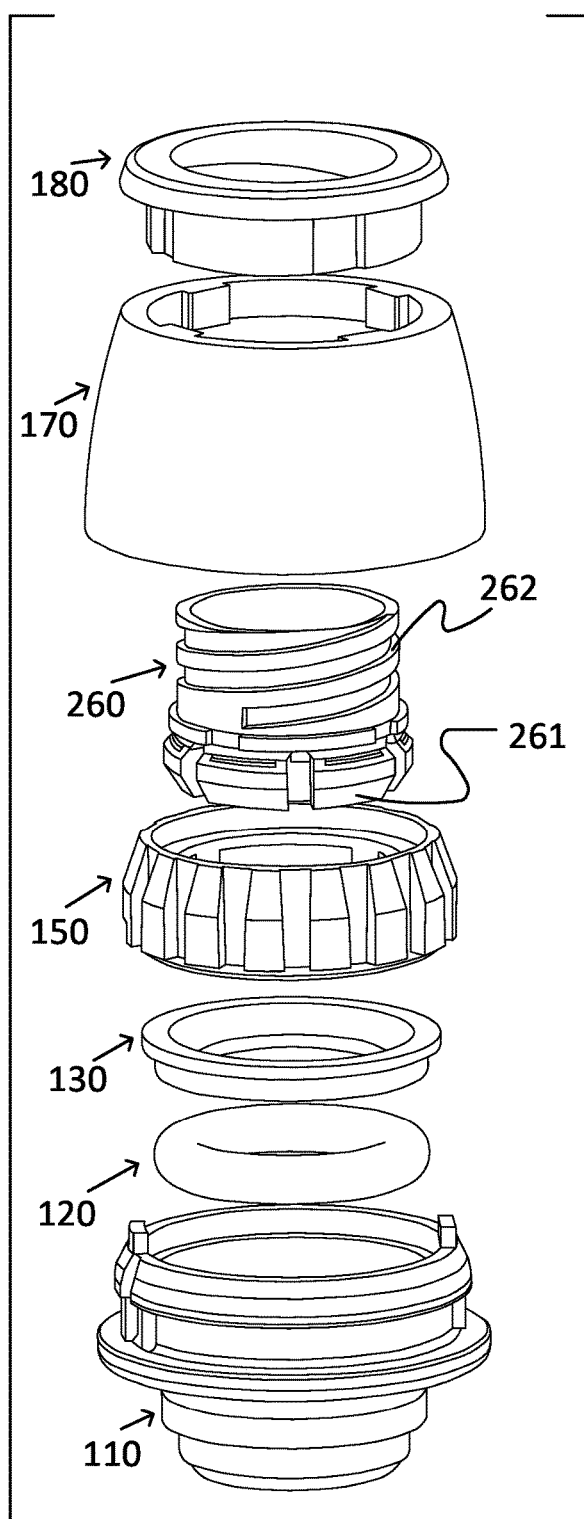
FIG. 7B shows an isometric view exploded view of the pipe coupling of FIG. 6.

FIGS. 7A and 7B show an isometric view of the pipe coupling 200 which show the threaded outer surface 262 and the legs 261 more clearly.

The pipe coupling 200 functions in a very similar manner to the pipe coupling 100 described above with reference to FIGS. 4 and 5.

Firstly, a pipe is inserted into the pipe coupling 200 in a pipe insertion direction. The teeth 241 of the gripping element 240 engage the outer surface of the pipe and prevent the pipe from moving axially and being pulled out. Due to the cross-sectional shape of the legs 261 which bulges radially outwardly, pulling of the pipe will result in the legs being forced radially inwardly thus increasing the force of the teeth 241 on the outside surface of the pipe making it more difficult to remove the pipe.

In order to release the pipe, the rotatable sleeve 170 is rotated in a first direction which causes the release collar 180 to move axially in a direction opposite the pipe insertion direction from a locked position to an unlocked position. The release collar 180 is then depressed in a pipe insertion direction which causes the pipe release element 260 to move axially in a pipe insertion direction.

By moving the pipe release element 260 axially in a pipe insertion direction, the legs 261 are moved into a space formed between the connecting element 150 and the space element 130. This causes the legs 261 to move radially outwardly and reduces the force exerted by the teeth 241 on the outer surface of the pipe. The pipe can then be pulled out of the pipe coupling 200.

Rotation of the rotatable sleeve 170 in a second direction will cause the release collar 180 to move axially in a pipe insertion direction from the unlocked position back to the locked position. The pipe coupling 200 can now be reused with a different pipe.

FIG. 8 shows an axial cross-section of the pipe coupling 100 to illustrate more clearly the tactile feedback described above with reference to FIGS. 1 to 3. FIG. 8 and the description of the tactile feedback similarly apply to pipe coupling 200 described above and shown in FIGS. 6 and 7.

Figure 8A:
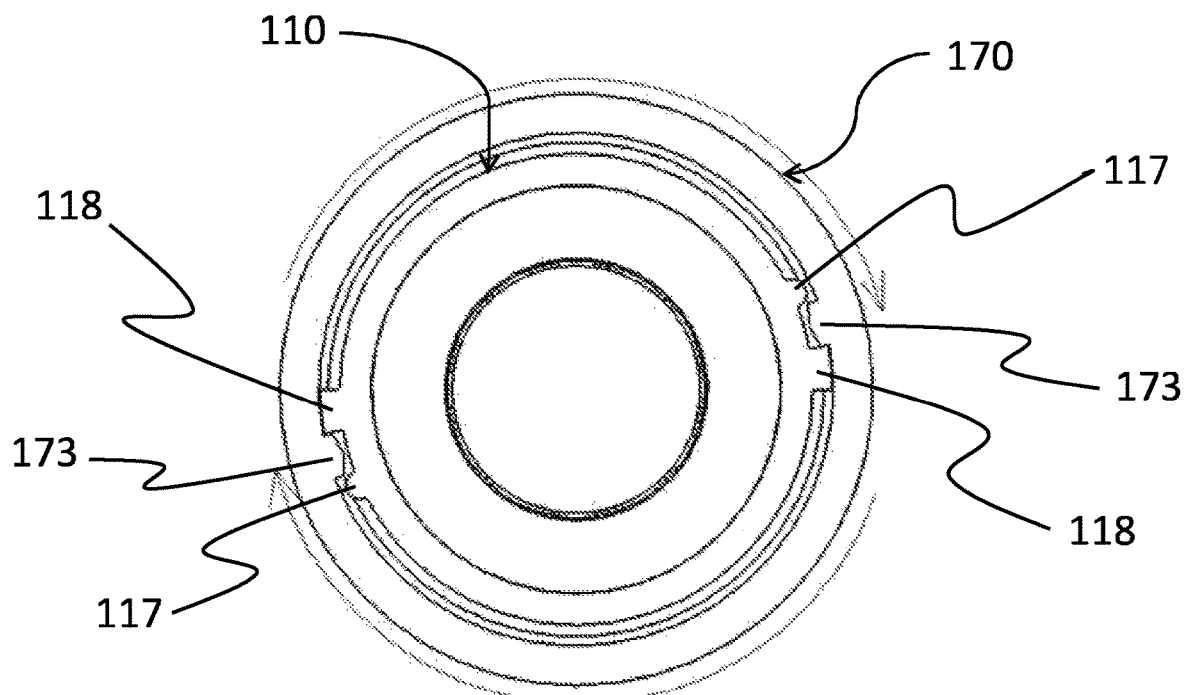
FIG. 8A shows an axial cross-section of the pipe coupling of FIG. 1 or FIG. 6 in a locked configuration.

FIG. 8A shows the pipe coupling 100 in a locked configuration. FIG. 8A shows the pair of first axial ridges 173 of the rotatable sleeve 170 and the pair of second axial ridges 117 and the pair of third axial ridges 118 of the coupling body 110. The second axial ridges 117 and the third axial ridges 118 are disposed adjacent to one another with a gap to accommodate the first axial ridge 173. The second axial ridges 117 are smaller and rounder in cross-sectional shape and are configured to provide tactile feedback in the form of a 'click'. The third axial ridges 118 are larger and rectangular in shape and are configured to prevent further rotation of the rotatable sleeve 170 once the release collar 180 is in the locked or unlocked position. In the locked configuration shown in FIG. 8A, the first axial ridge 173 is disposed between the second axial ridge 117 and the third axial ridge 118. When rotating the rotatable sleeve 170 in the second direction (i.e. clockwise) from an unlocked to a locked configuration, the first axial ridge 173 engages the second axial ridge 117 to provide tactile feedback in the form of a 'click' when the release collar 180 is in a locked position. The third axial ridge 118 engages the first axial ridge 173 when the rotatable sleeve 170 is rotated in the second direction to prevent further rotation of the rotatable sleeve 170 once the pipe coupling 100 is in the locked configuration.

Figure 8B:
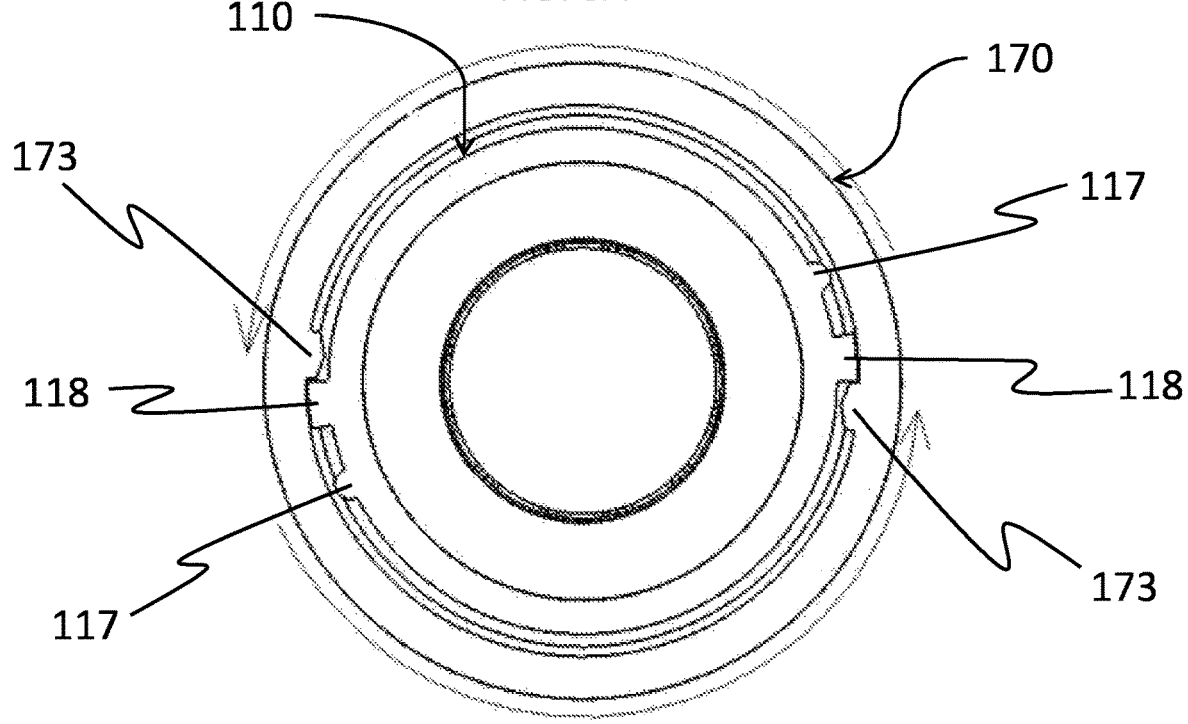
FIG. 8B shows an axial cross-section of the pipe coupling of FIG. 1 or FIG. 6 in an unlocked configuration.

FIG. 8B shows the pipe coupling 110 in an unlocked configuration. In the unlocked state, the rotatable sleeve 170 has been rotated in a first direction (i.e. anticlockwise) by 180 degrees compared to the locked configuration shown in FIG. 8A. When rotating the rotatable sleeve in a first direction from a locked position to an unlocked position, the first axial ridge 173 engages the second axial ridge 117 to provide tactile feedback when the release collar is no longer in a locked position. Once the pipe coupling is in an unlocked configuration, as shown in FIG. 8B, the first axial ridge 173 is in contact with the third axial ridge 118 which stops the rotatable sleeve 170 from further rotation in the first direction.

Figure 9:
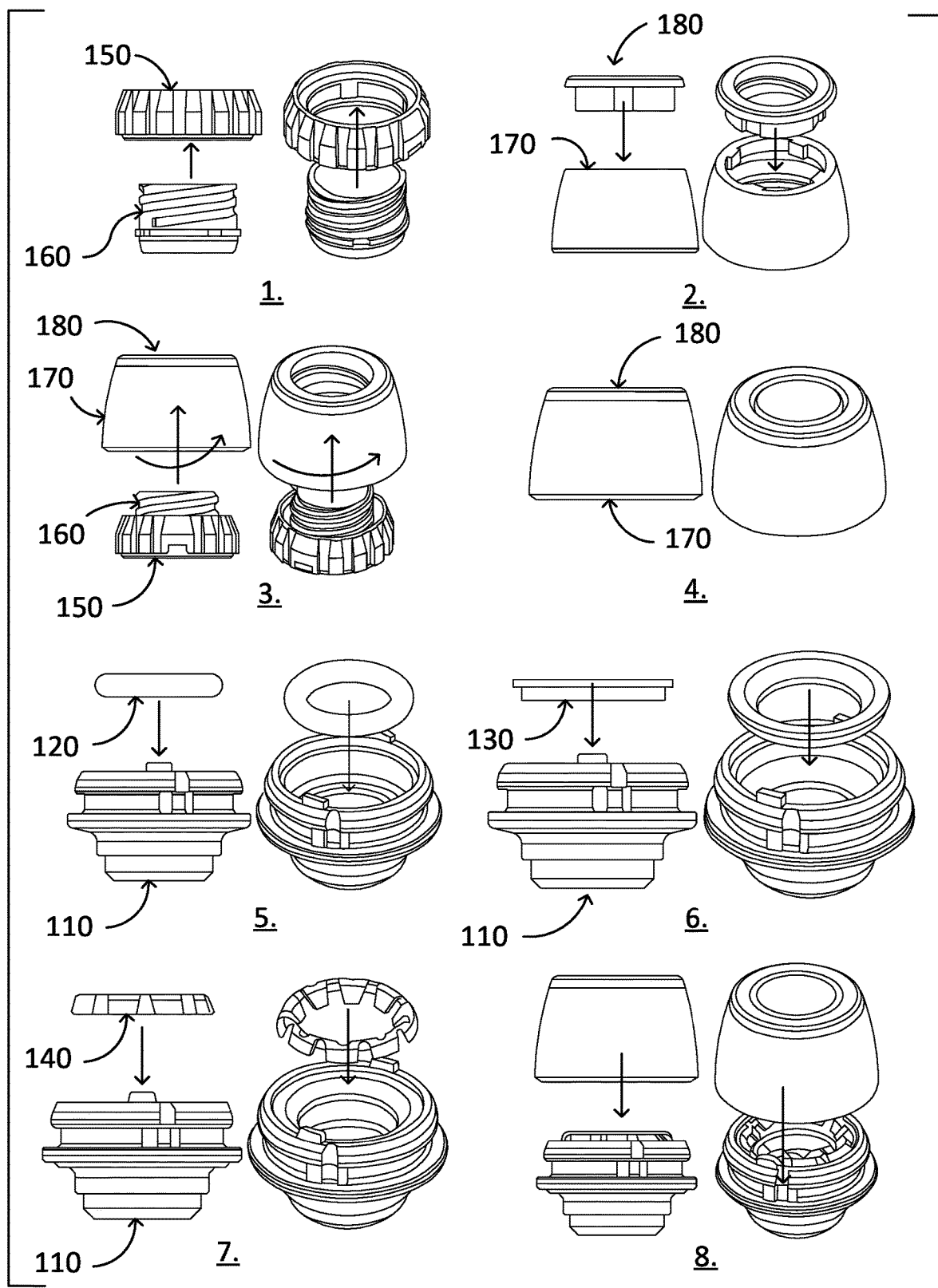
FIG. 9 illustrates a method of assembling the pipe coupling of FIG. 1.

FIG. 9 illustrates a method of assembling the pipe coupling 100 of FIGS. 1 to 5.

The first step (1.) shown in FIG. 9 involves moving the pipe release element 160 through the connecting element 150. The axial ridges 153 of the connecting element 150 engage with the axial grooves 164 of the pipe release element 160. The circumferential ridge 152 on the inside surface of the connecting element 150 engages with a corresponding circumferential ridge 163 on the outside surface of the pipe release element 160.

The second step (2.) involves inserting the release collar 180 into the rotatable sleeve 170 such that the annular flange 181 contacts the end of the rotatable sleeve 170.

The third step (3.) involves inserting the connecting element 150 and the pipe release element 160 into the rotatable sleeve 170 such that the rotatable sleeve 170 covers both elements. The pipe release element 160 and the connecting element 150 are rotated with respect to the rotatable sleeve 170 and the release collar 180 so that the threaded outer surface 162 of the pipe release element 160 engages the threaded inner surface 182 of the release collar 180.

The fourth step (4.) shows a finished first subassembly comprising the connecting element 150, the pipe release element 160, the rotatable sleeve 170 and the release collar 180.

In the fifth step (5.), the sealing element 120 is inserted into the bore of the coupling element 110 so that it contacts a second shoulder 113 of the coupling body 110.

In the sixth step (6.), the spacer element 130 is inserted into the bore of the coupling body 110 such that it contacts the sealing element 120 and the third shoulder 114.

In the seventh step (7.), the gripping element 140 is placed on the spacer element 130 such that the legs 142 contact the spacer element 130. This produces a second subassembly comprising the coupling body 110, the sealing element 120, the spacer element 130 and the gripping element 140.

In the eighth step (8.) the first subassembly is then inserted over the second subassembly. The first axial ridge 173 of the rotatable sleeve 170 is inserted through a notch in the outer annular shoulder or ridge 116 of the coupling body 110. The assembled pipe coupling 100 is in the locked configuration.

Figure 10:
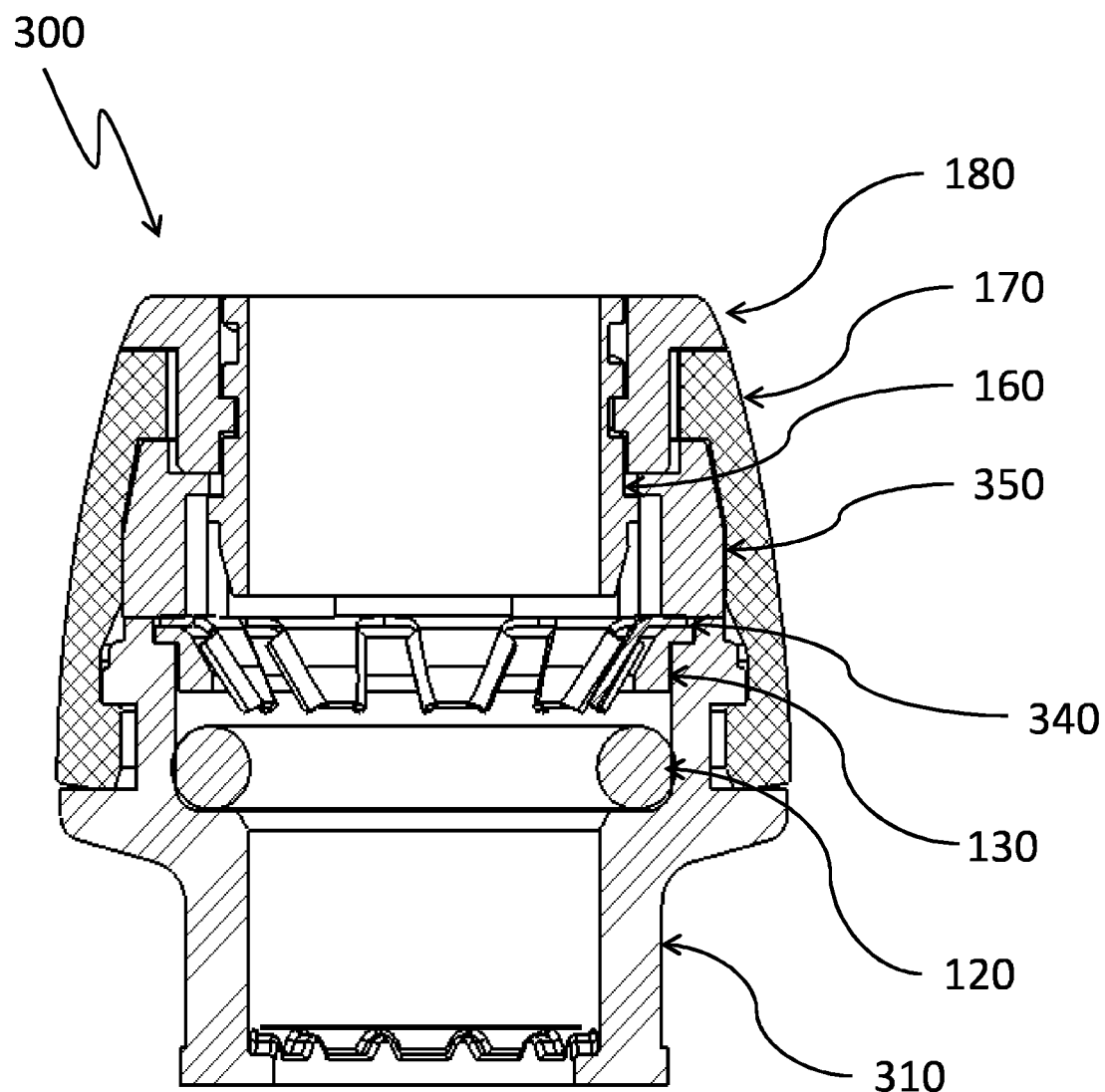
FIG. 10 shows a cross-sectional view of a further pipe coupling according to a third embodiment of the present invention.

FIG. 10 shows a cross-sectional view of a third embodiment of a pipe coupling 300. The pipe coupling 300 comprises a coupling body 310, a sealing element 120, a spacer element 130, a gripping element 340, a connecting element 340, a pipe release element 160, a rotatable sleeve 170 and a release collar 180.

The sealing element 120, spacer element 130, pipe release element 160, rotatable sleeve 170 and release collar 180 are identical to the ones described above with reference to FIGS. 1 to 5 and the same reference numerals here indicate the same elements.

Pipe coupling 300 differs from pipe coupling 100 of FIG. 1 in that it comprises a modified coupling body 310, gripping element 340 and connecting element 350.

Figure 11:
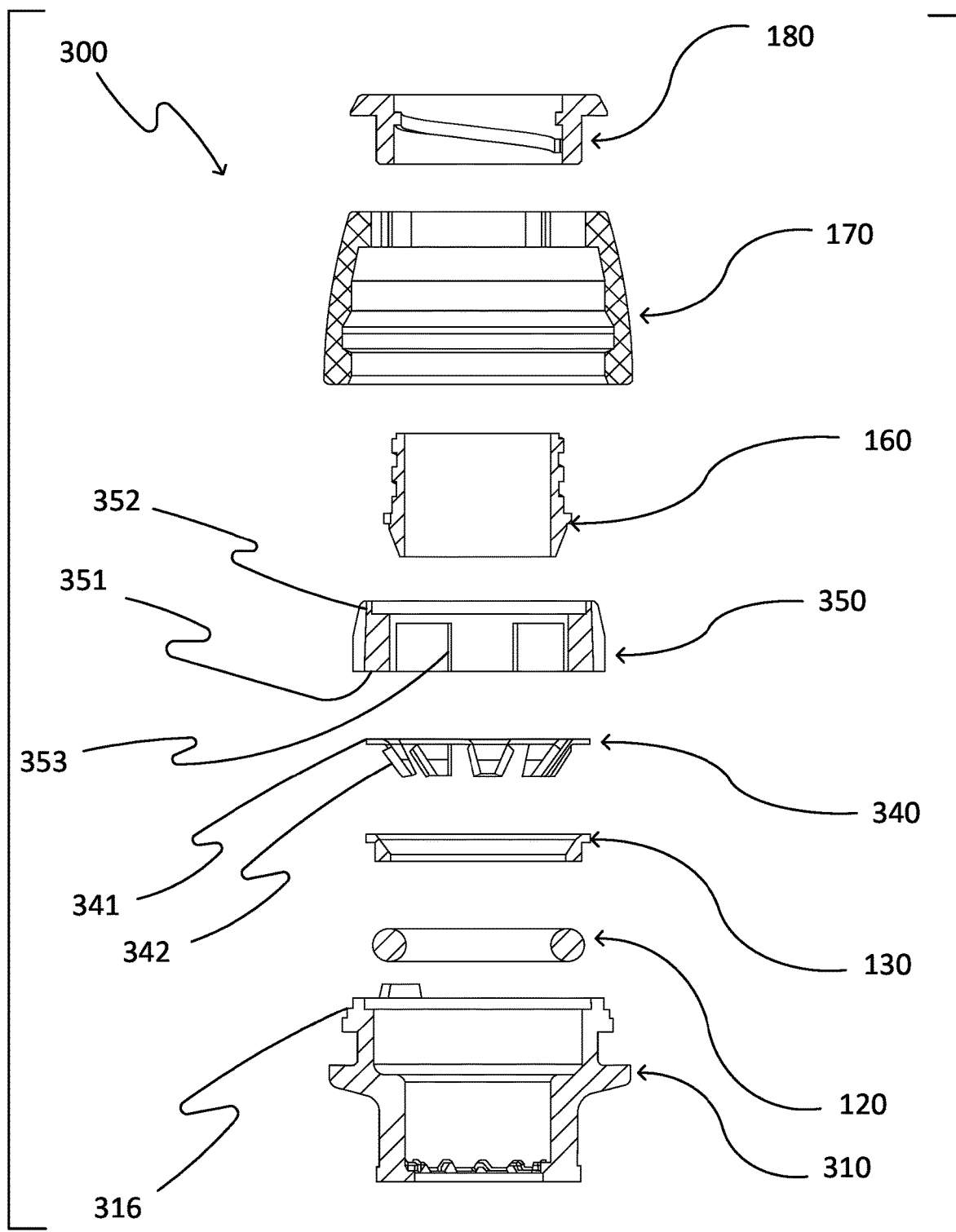
FIG. 11 shows a cross-sectional exploded view of the pipe coupling of FIG. 10.
Figure 12A:
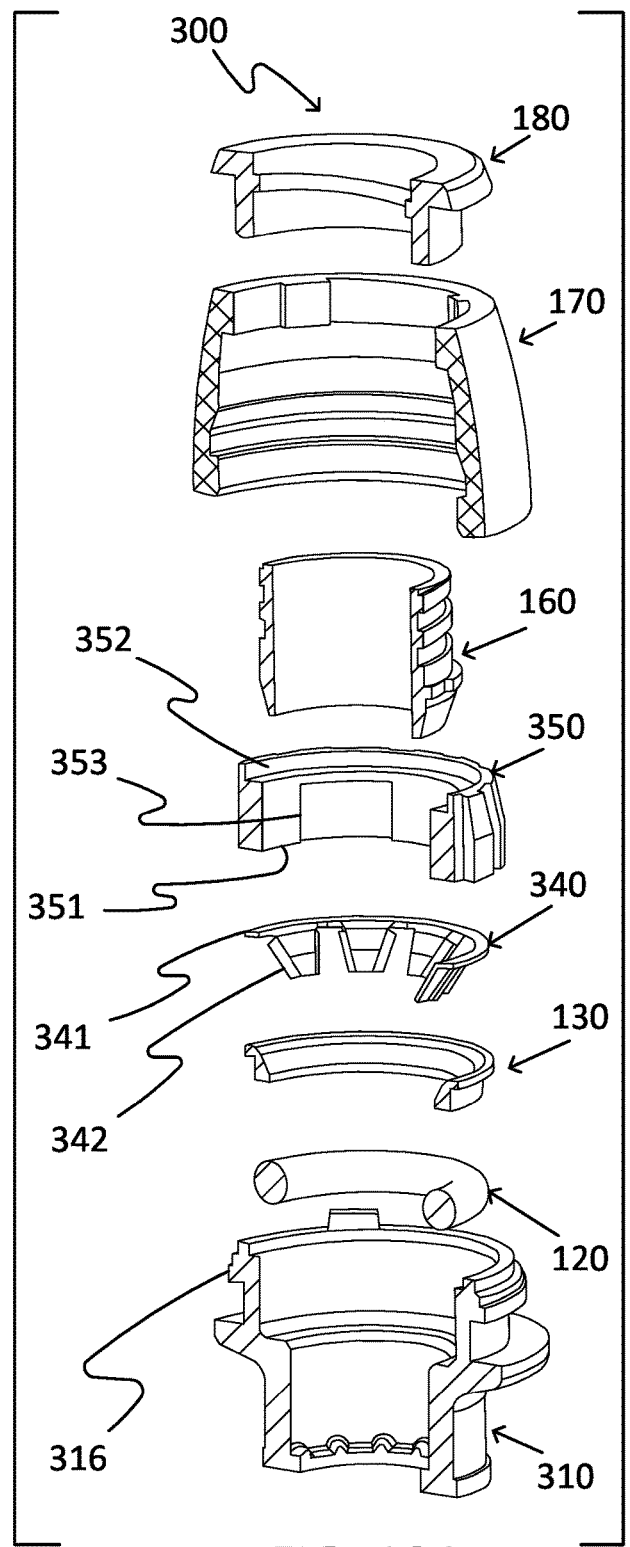
FIG. 12A shows an isometric cross-sectional exploded view of the pipe coupling of FIG. 10.
Figure 12B:
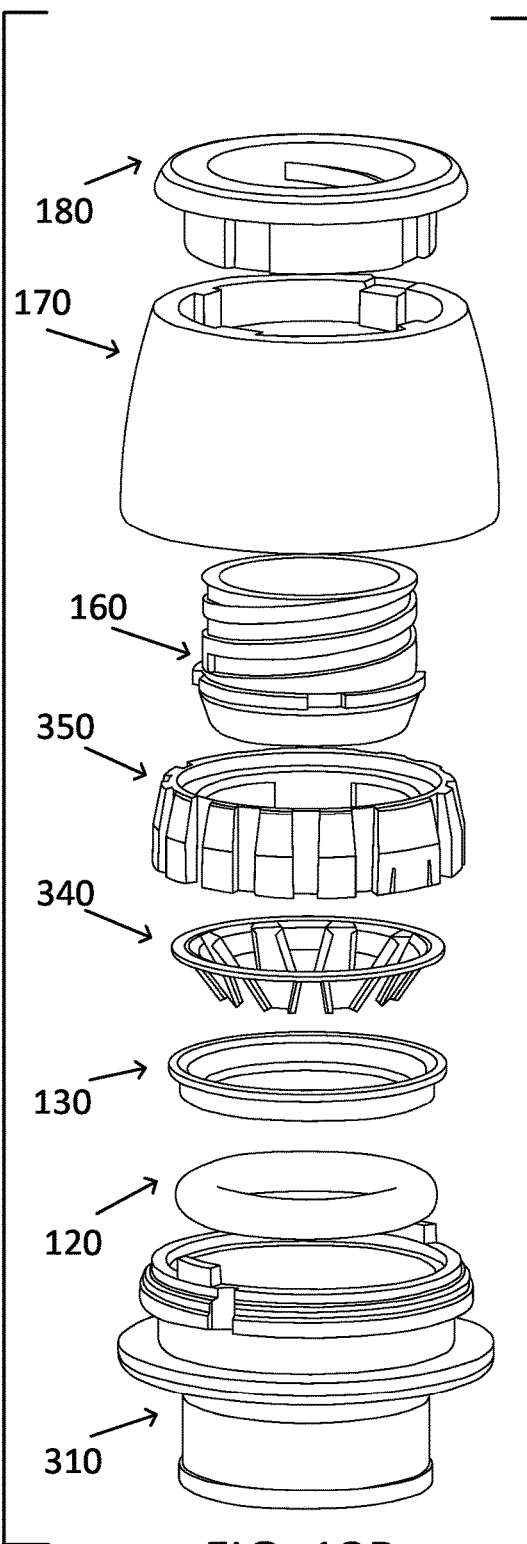
FIG. 12B shows an isometric exploded view of the pipe coupling of FIG. 10.

FIG. 11 shows an exploded cross-sectional view of pipe coupling 300, and FIG. 12A and FIG. 12B show an exploded isometric cross-sectional view and an exploded isometric view of pipe coupling 300, respectively. The modified features of pipe coupling 300 can be more clearly seen in FIGS. 11 and 12 and will therefore be described with reference to these figures.

Figure 14A:
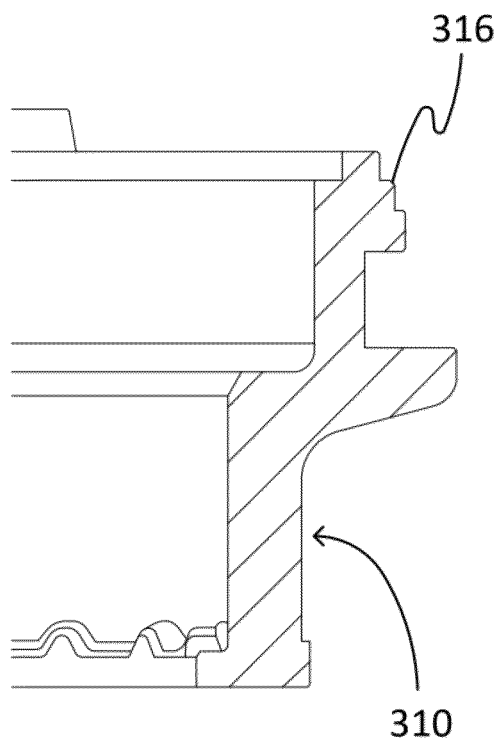
FIGS. 14A-D illustrate different shapes for the annular shoulder of the coupling body of the pipe coupling.

Coupling body 310 is similar to and comprises the same features as the coupling body 110 described above with reference to FIGS. 1 to 5, except that the outer annular shoulder or ridge 316 is a double stepped shoulder with a stepped annular surface (this is also shown in FIG. 14A).

Gripping element 340 comprises a planar or flat annular ring 341 with a plurality of teeth 342 extending radially inwardly from the annular ring 341. The teeth 342 are inclined at an angle with respect to the annular ring 341 in a pipe insertion direction. The ends of the teeth 342 are able to engage an outer surface of a pipe which is inserted into the pipe coupling 300 to hold the pipe within the pipe coupling 300. Each of the plurality of teeth 342 also comprises a first strengthening element which is in this case a first flange 343 and a second strengthening element which is in this case a second flange 344 (see also FIG. 13). The first and/or second strengthening element may also be, for example, a rib, ridge, lip or other strengthening element.

The first flange 343 and the second flange 344 extend along opposite edges of each of the teeth 342 and thereby strengthen the teeth 342 without increasing the force required to insert the pipe.

The connecting element 350 has a circumferential ridge 352 on its inside surface for engaging with a corresponding circumferential ridge on the outside surface of the pipe release element 160 and a number of axial ridges 353 which engage with a number of axial grooves of the pipe release element 160, similar to connecting element 150 of FIGS. 1 to 5.

However, connecting element 350 does not have an internal sloping surface 151, but rather has a flat end surface 351 which contacts the planar annular ring 341 of the gripping element 340 to hold the gripping element 340 in place.

The operation of pipe coupling 300 is identical to that of pipe coupling 100 described with respect to FIGS. 4 and 5. The method of assembly of pipe coupling 300 is also identical to that described with respect to FIG. 9.

Figure 13A:
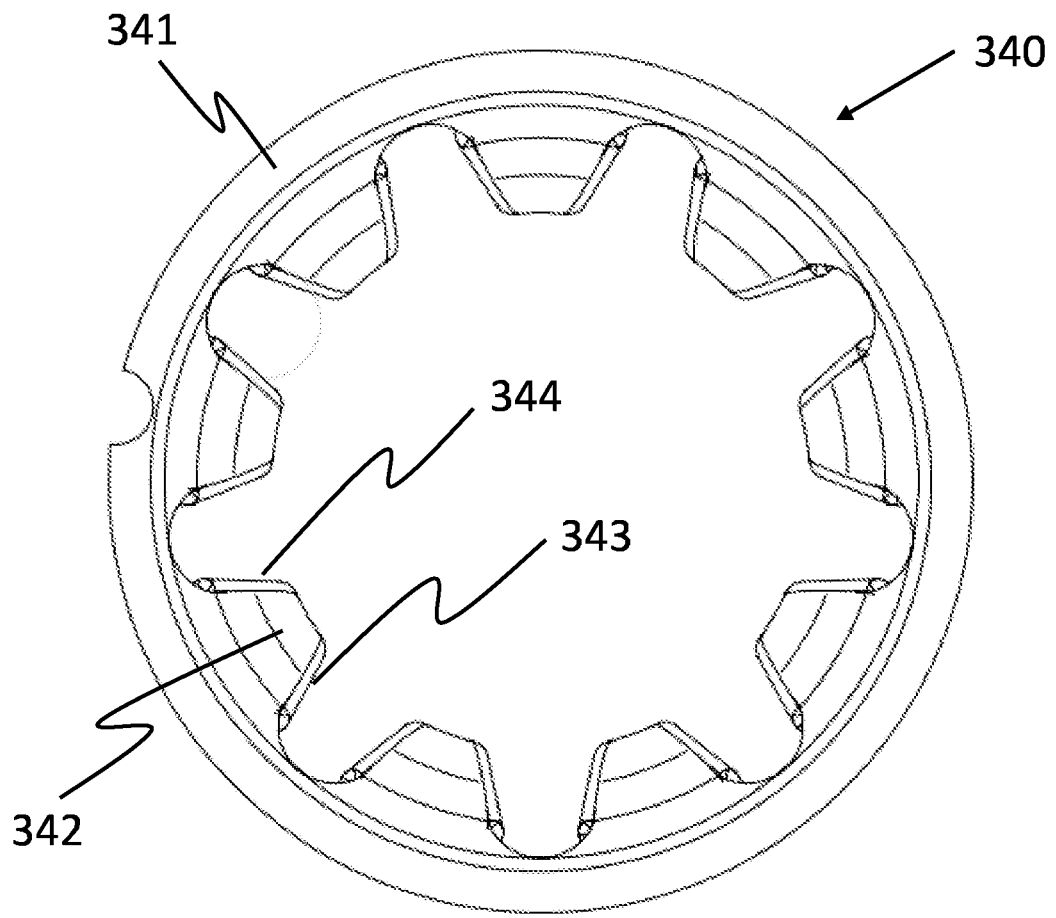
FIG. 13A shows a plan view of the gripping element of the pipe coupling of FIG. 10.
Figure 13B:
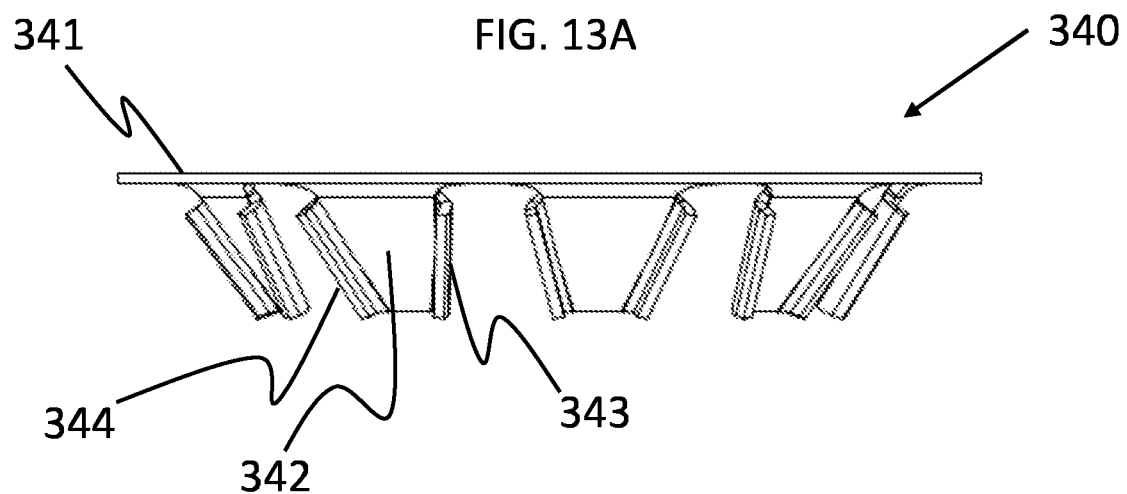
FIG. 13B shows a side view of the gripping element of the pipe coupling of FIG. 10.
Figure 13C:
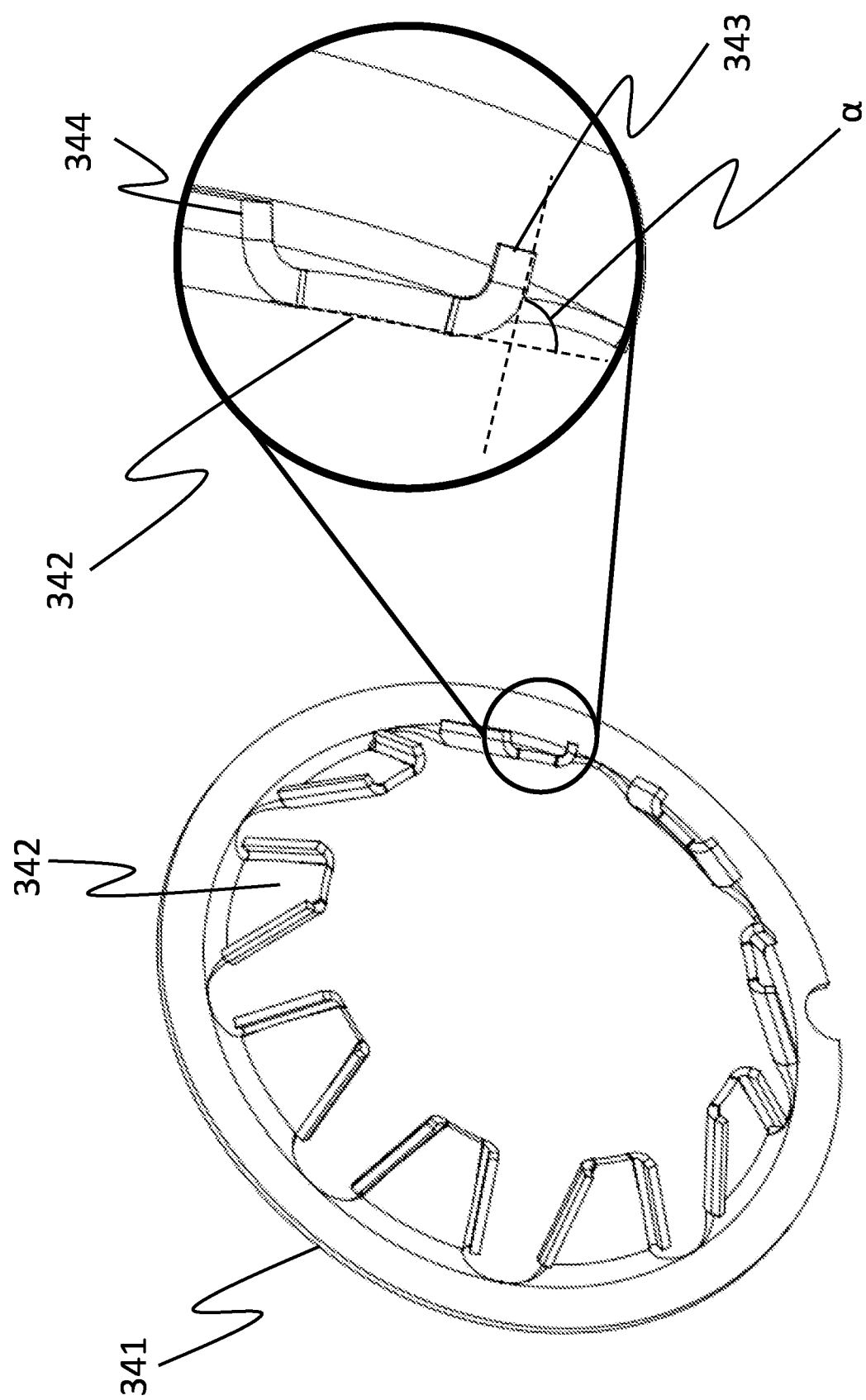
FIG. 13C shows an isometric view of the gripping element of the pipe coupling of FIG. 10.

FIGS. 13A-C show the gripping element 340 in more detail. FIG. 13A shows the annular ring element 341 and the plurality of teeth 342 extending radially inwardly from the annular ring 341. Each of the plurality of teeth 342 is in the shape of a trapezoid and tapers in a direction radially inwardly. This means that the teeth 342 are wider at the point where they attach to the annular ring 341 and become narrower as they extend radially inwardly. The first flange 343 and second flange 344 extend along the majority of the length of the teeth 342 on opposite edges of the teeth 342. There is a small gap between the end of each flange 343, 344 and the annular ring 341 to allow for relative movement and bending between the teeth 342 and the annular ring 341. The flanges 343, 344 increase the bending stiffness of the teeth 342 and therefore allow the teeth 342 to better hold a pipe within the pipe coupling 300. Furthermore, due to the gap between the end of the flanges 343, 344 and the annular ring 341, the force required to bend the teeth 342 when inserting the pipe into the pipe coupling 300 is not increased.

As shown in FIG. 13B, the annular ring 341 is in the form of a flat, planar disc. The plurality of teeth 342 are inclined at an angle with respect to the annular ring 341 such that the teeth 342 point in a direction of pipe insertion.

FIG. 13C shows an isometric view of the gripping element 340 and a close-up view of one of the teeth 342 having flanges 343, 344. The flanges 343, 344 are formed by bending the edges of the teeth 342 with respect to the main body of the teeth 342. The angle α between the teeth 342 and the flange 343 may be between 45° and 120° and preferably between 60° and 90°.

Only some of the plurality of teeth 342 may comprise flanges 343, 344. Furthermore, the plurality of teeth 342 may only comprise a single flange extending along one edge of the teeth 342, rather than two flanges on opposite edges of the teeth 342. Similarly, the gripping element 140 of pipe coupling 100 of FIG. 1 may also be equipped with corresponding flanges to increase the bending stiffness of the teeth 141.

FIGS. 14A-D show cross-sectional views of the coupling body 310 having different shapes of the annular shoulder or ridge 316.

FIG. 14A shows the annular shoulder 316 having a double stepped shoulder. This reduces the points of contact and therefore the friction between the rotatable sleeve 170 and the coupling body 310 when assembling the pipe coupling 300. This results in a lower force required to attach the rotatable sleeve 170 to the coupling body 310.

Figure 14B:
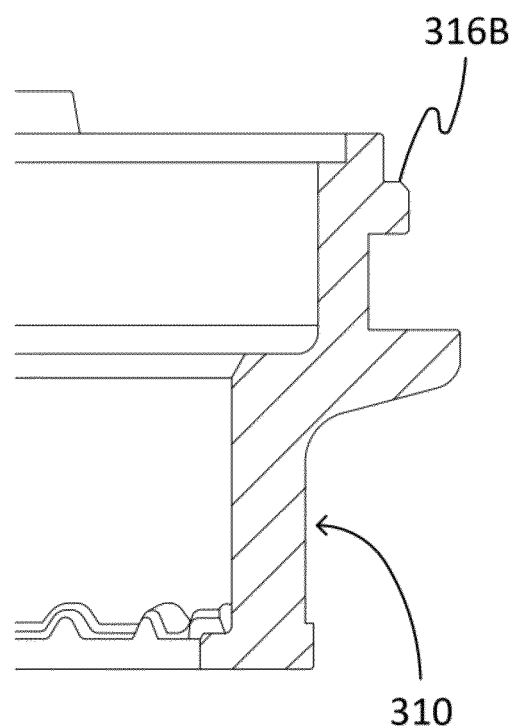

FIG. 14B shows the coupling body 310 having an annular shoulder 316B in the shape of a singular stepped shoulder which extends vertically downwards, then horizontally and vertically downwards again. This shape of the annular shoulder 3166 further reduces the contact area and therefore the friction between the coupling body 310 and the rotatable sleeve 170 during assembly, which means that the force required to attach the rotatable sleeve 170 to the coupling body 310 is reduced.

Figure 14C:
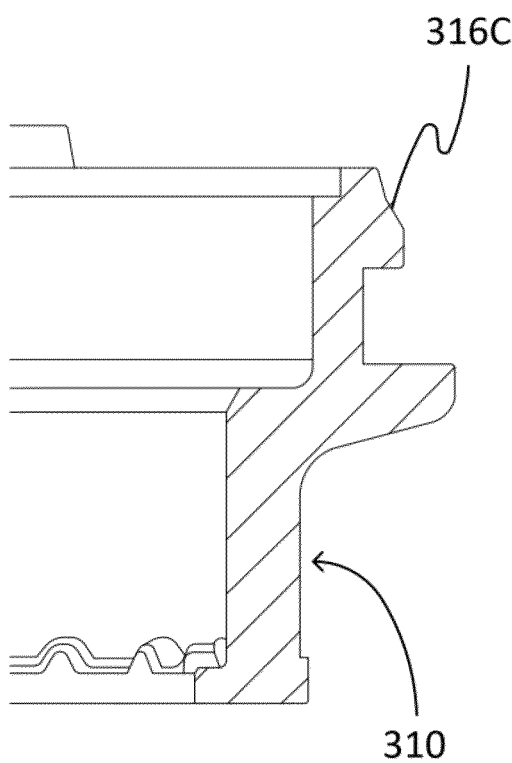

FIG. 14C shows the coupling body 310 having an annular shoulder 316C in the shape of a concave inclined surface. This shape of the annular shoulder 316C means that during assembly of the pipe coupling 300, the rate of expansion of the rotatable sleeve 170 is initially slower and then progressively accelerates. This gives the materials time to adjust and thereby avoids brittle fracture of the rotatable sleeve 170 and/or the coupling body 310.

Figure 14D:
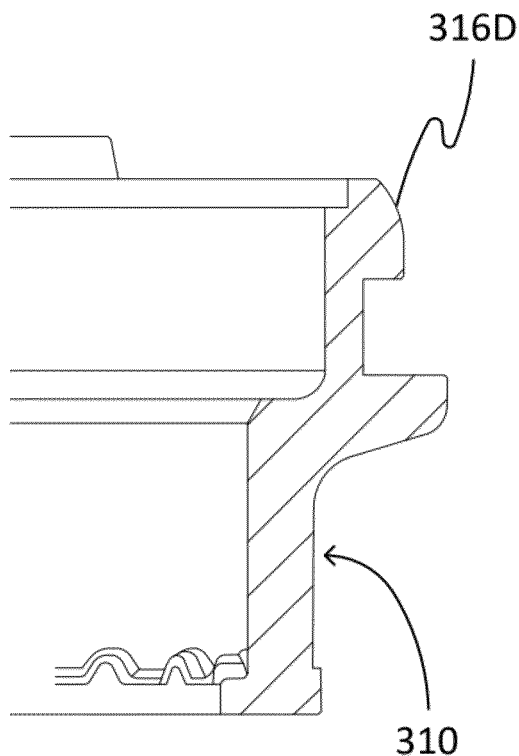

FIG. 14D shows the coupling body 310 having an annular shoulder 316D in the shape of a convex inclined surface. This shape of the annular shoulder 316D results in a greater initial rate of expansion of the rotatable sleeve 170 during assembly and therefore an easier assembly.

The different shapes of the annular shoulder 316 shown in FIGS. 14A-D may also be implemented in the coupling body 110 of pipe couplings 100 and 200.

A further advantage of the pipe couplings 100, 200 and 300 described herein is that the force required to attach the rotatable sleeve 170 to the coupling body 110, 310 is reduced but the force required to separate the rotatable sleeve 170 from the coupling body 110, 310 is increased compared to previous known pipe couplings. The pipe couplings 100, 200 and 300 are thus more robust, more secure and easier to assemble. This effect is achieved by the specific shape of the coupling body 110, 310 and the arrangement of the internal shoulder 113 and external annular shoulder 116, as illustrated in FIG. 15.

Figure 15A:
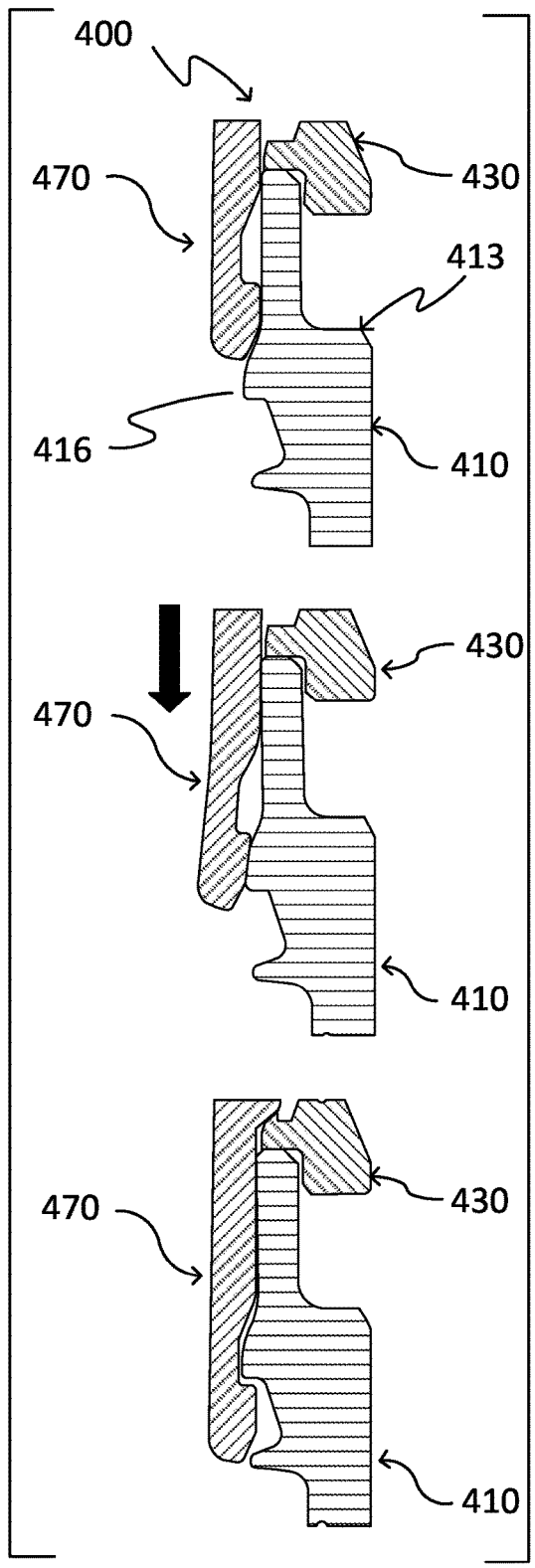
FIG. 15A shows a sequence of attaching a sleeve to a coupling body for a prior art pipe coupling.

FIG. 15A shows a cross-sectional side view of a sequence of attaching a sleeve 470 to a coupling body 410 for a prior art pipe coupling 400. The coupling body 410 comprises an internal annular shoulder 413 within the bore of the coupling body 410 and an external annular shoulder 416, which is substantially axially aligned with the internal annular shoulder 413. The sleeve 470 comprises an annular groove which engages with the external annular shoulder 416 to attach the sleeve 470 to the coupling body 410.

As can be seen in FIG. 15A, when attaching the sleeve 470 to the coupling body 410, the end of the sleeve 470 bends radially outwardly to overcome the annular shoulder 416. Due to the fact that the external annular shoulder 416 is substantially axially aligned with the internal shoulder 413, the wall of the coupling body 410 is thicker and therefore less flexible at the point where the annular external shoulder 416 is positioned. The wall of the coupling body 410 therefore does not deform when the sleeve 470 is attached. All of the deformation and stresses are limited to the sleeve 470 which can lead to cracking and failure of the sleeve 470 during assembly.

Figure 15B:
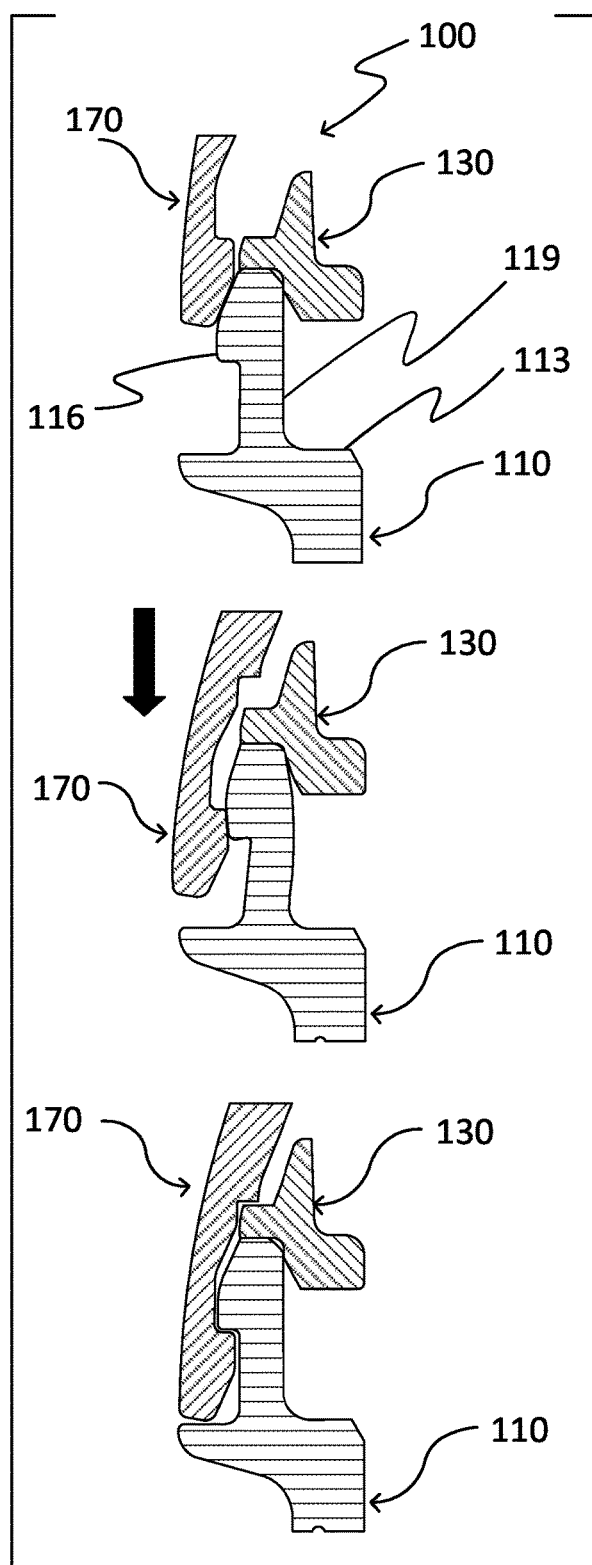
FIG. 15B shows a sequence of attaching the rotatable sleeve to the coupling body for the pipe coupling of FIG. 1.

FIG. 15B shows the same sequence of attaching the rotatable sleeve 170 to the coupling body 110 for pipe coupling 100 and 200. However, this equally applies to coupling body 310 of pipe coupling 300.

The coupling body 110 comprises the second internal shoulder 113 and the external annular shoulder 116. The external annular shoulder 116 is offset from the internal shoulder 113 along the longitudinal axis. The external annular shoulder 116 is connected to the internal shoulder 113 through an elongate annular portion 119. This results in the wall of the coupling body 110 being thinner and more flexible at the point where the external annular shoulder 116 is positioned.

When the pipe coupling 100 is assembled, as rotatable sleeve 170 is attached to the coupling body 110, both the rotatable sleeve 170 and the elongate annular portion of the coupling body 110 will deform as the rotatable sleeve 170 passes over the external annular shoulder 116. The stress is therefore spread between the rotatable sleeve 170 and the coupling 110, resulting in less stress being applied to the rotatable sleeve 170 during assembly. This prevents cracking and failure of the sleeve 170. Furthermore, this also results in the force required to attach the rotatable sleeve 170 to the coupling body 110 being reduced, while increasing the force required to remove the rotatable sleeve 170 from the coupling body 110. The pipe coupling 100 is therefore more robust and secure whilst also being easier to assemble.

Various modifications will be apparent to those skilled in the art.

For example, the coupling body 100 may not comprise radially disposed ridges 112. The coupling body further may not comprise a first shoulder 111. The coupling body 110 further may not comprise a second shoulder 113. The coupling body 110 further may not comprise a third shoulder 114.

The coupling body may not comprise the first and/or second axial ridges which provide tactile feedback.

The sealing element 120 may be made from any elastic material which allows it to make a fluid-tight seal with the outside surface of a pipe inserted into the pipe coupling 100.

The sealing element 120 may have a non-circular cross-section.

The pipe coupling 100 may not comprise a sealing element 120 at all.

The spacer element 130 may not comprise a circular inner bevel 132. The spacer element 130 further may not comprise a flange 131.

The pipe coupling 100 may not comprise a spacer element 130 at all.

The gripping element 140 may be made from any metal or metallic material. The gripping element 140 may even be made from non-metallic materials, such as a plastic.

The gripping element 140 may be made of two different materials, with the legs 142 made from a different material than the teeth 141.

The gripping element 140 may not comprise any legs 142. The teeth 141 may instead be attached to a metal ring or even directly attached to the connecting element 150 or the spacer element 130.

The teeth 141 of the gripping element 140 may not be inclined in a pipe insertion direction but may be pointing straight and radially inwardly.

The gripping element 140 or the gripping element 340 may include a ridge, rib or crease extending centrally and longitudinally along the length of the teeth 141 or teeth 342 to strengthen the teeth 141, 342.

The pipe coupling 100 may not comprise a connecting element 150. The connecting element 150 and the coupling body 110 may be formed as a single element. The pipe release element may be directly coupled to the coupling body 110.

The pipe release element 160 may not comprise a tapered outer surface 161.

The rotatable sleeve 170 may not comprise first axial ridge 173 to provide tactile feedback.

The rotatable sleeve 170 may not be an outer sleeve which encloses the other elements. Instead the rotatable sleeve 170 may be an intermediate element.

The rotatable sleeve 170 may be rotated by an angle other than 180 degrees to change the configuration of the pipe coupling from the locked configuration to the unlocked configuration and vice versa. The angle of rotation is preferably between 45 degrees and 360 degrees, even more preferably between 90 degrees and 270 degrees.

The release collar 180 may not comprise an annular flange 181. Instead the release collar 180 may comprise another element which allows it to be moved axially by a user.

The pipe coupling 100 may comprise only one first axial ridge 173, one second axial ridge 117 and one third axial ridge 118.

The pipe coupling 100 may comprise more than two first axial ridges 173, more than two second axial ridges 117 and more than three third axial ridges 118.

The pipe coupling 100 may accommodate tubular pipes as well as other shapes of pipes such as rectangular or triangular pipes, for example.

The gripping element 240 and the teeth 241 may be integrally formed with the pipe release element 260.

All of the above are fully within the scope of the present disclosure, and are considered to form the basis for alternative embodiments in which one or more combinations of the above described features are applied, without limitation to the specific combination disclosed above.

In light of this, there will be many alternatives which implement the teaching of the present disclosure. It is expected that one skilled in the art will be able to modify and adapt the above disclosure to suit its own circumstances and requirements within the scope of the present disclosure, while retaining some or all technical effects of the same, either disclosed or derivable from the above, in light of his common general knowledge in this art. All such equivalents, modifications or adaptations fall within the scope of the present disclosure.

The invention claimed is:

1. A pipe coupling for receiving, holding and releasing a pipe, comprising:
   a coupling body having a bore with a geometric axis into which a pipe can be inserted in a pipe insertion direction;
   a rotatable sleeve which is arranged at least partially around the coupling body and which is rotatable around the axis of the bore with respect to the coupling body;
   a gripping element configured to engage a surface of the pipe;
   a pipe release element configured to disengage the gripping element from the surface of the pipe upon axial movement of the pipe release element; and
   a release collar coupled to an end of the rotatable sleeve;
   wherein axial rotation of the rotatable sleeve in a first direction causes the release collar to move axially from a locked position to an unlocked position and wherein in the unlocked position, the release collar can be moved axially in the pipe insertion direction to cause the pipe release element to disengage the gripping element from the surface of the pipe;
   wherein the release collar is coupled to the rotatable sleeve such that the release collar rotates together with the rotatable sleeve, and/or wherein the release collar is coupled to the rotatable sleeve such that the release collar can move axially with respect to the rotatable sleeve; and
   wherein the release collar comprises a number of axial grooves or ridges to engage a number of axial ridges or grooves of the rotatable sleeve.

2. The pipe coupling of claim 1, wherein axial rotation of the rotatable sleeve in a second direction causes the release collar to move axially from the unlocked position to the locked position.

3. The pipe coupling of claim 1, wherein the pipe release element is coupled to the coupling body to prevent rotational movement of the pipe release element with respect to the coupling body, and/or wherein the pipe release element is coupled to the coupling body to allow axial movement of the pipe release element with respect to the coupling body.

4. The pipe coupling of any of claim 1, wherein the gripping element is separate from the pipe release element.

5. The pipe coupling of claim 4, wherein the gripping element is disposed adjacent the pipe release element.

6. The pipe coupling of claim 5, wherein the pipe release element and the gripping element are disposed sequentially in the pipe insertion direction.

7. The pipe coupling of claim 4, wherein the gripping element comprises a number of teeth extending radially inwardly to engage with an outer surface of the pipe.

8. The pipe coupling of claim 7, wherein the teeth are inclined in the pipe insertion direction.

9. The pipe coupling of claim 1, further comprising a connecting element for connecting the coupling body to the pipe release element.

10. The pipe coupling of claim 9, wherein the connecting element is coupled to the coupling body to prevent rotation of the connecting element with respect to the coupling body, and/or wherein the connecting element is coupled to the coupling body to prevent axial movement of the connecting element with respect to the coupling body.

11. A pipe coupling for receiving, holding and releasing a pipe, comprising:
    a coupling body having a bore with a geometric axis into which a pipe can be inserted in a pipe insertion direction;
    a rotatable sleeve which is arranged at least partially around the coupling body and which is rotatable around the axis of the bore with respect to the coupling body;
    a gripping element configured to engage a surface of the pipe;
    a pipe release element configured to disengage the gripping element from the surface of the pipe upon axial movement of the pipe release element; and
    a release collar coupled to an end of the rotatable sleeve;
    wherein axial rotation of the rotatable sleeve in a first direction causes the release collar to move axially from a locked position to an unlocked position and wherein in the unlocked position, the release collar can be moved axially in the pipe insertion direction to cause the pipe release element to disengage the gripping element from the surface of the pipe;
    wherein the pipe release element has a threaded outer surface which engages with a threaded inner surface of the release collar.

12. A pipe coupling for receiving, holding and releasing a pipe, comprising:
    a coupling body having a bore with a geometric axis into which a pipe can be inserted in a pipe insertion direction;
    a rotatable sleeve which is arranged at least partially around the coupling body and which is rotatable around the axis of the bore with respect to the coupling body;
    a gripping element configured to engage a surface of the pipe;
    a pipe release element configured to disengage the gripping element from the surface of the pipe upon axial movement of the pipe release element; and
    a release collar coupled to an end of the rotatable sleeve;
    wherein axial rotation of the rotatable sleeve in a first direction causes the release collar to move axially from a locked position to an unlocked position and wherein in the unlocked position, the release collar can be moved axially in the pipe insertion direction to cause the pipe release element to disengage the gripping element from the surface of the pipe;
    wherein the release collar is coupled to the rotatable sleeve such that the release collar rotates together with the rotatable sleeve, and/or wherein the release collar is coupled to the rotatable sleeve such that the release collar can move axially with respect to the rotatable sleeve; and
    wherein the release collar comprises a number of axial grooves or ridges to engage a number of axial ridges or grooves of the rotatable sleeve.

13. A pipe coupling for receiving, holding and releasing a pipe, comprising:
- a coupling body having a bore with a geometric axis into which a pipe can be inserted in a pipe insertion direction;
- a rotatable sleeve which is arranged at least partially around the coupling body and which is rotatable around the axis of the bore with respect to the coupling body;
- a gripping element configured to engage a surface of the pipe;
- a pipe release element configured to disengage the gripping element from the surface of the pipe upon axial movement of the pipe release element; and
- a release collar coupled to an end of the rotatable sleeve;
- wherein axial rotation of the rotatable sleeve in a first direction causes the release collar to move axially from a locked position to an unlocked position and wherein in the unlocked position, the release collar can be moved axially in the pipe insertion direction to cause the pipe release element to disengage the gripping element from the surface of the pipe; and
- further comprising a connecting element for connecting the coupling body to the pipe release element; and
- wherein the pipe release element is coupled to the connecting element to prevent rotation of the pipe release element, and/or wherein the pipe release element is coupled to the connecting element to allow axial movement of the pipe release element with respect to the connecting element.

14. A method of assembling a pipe coupling for receiving, holding and releasing a pipe, the method comprising:
- coupling a release collar to the end of a rotatable sleeve;
- coupling a pipe release element to the release collar to produce a first subassembly, wherein the rotatable sleeve and the release collar are rotatable with respect to the pipe release element;
- inserting a gripping element into a coupling body comprising a bore with a geometric axis into which a pipe can be inserted in a pipe insertion direction to produce a second subassembly;
- attaching the first subassembly to the second subassembly to produce a pipe coupling in which axial rotation of the rotatable sleeve in a first direction causes the release collar to move axially from a locked position to an unlocked position and in the unlocked position, the release collar can be moved axially in the pipe insertion direction to cause the pipe release element to disengage the gripping element from the surface of the pipe.

15. A method of assembling a pipe coupling for receiving, holding and releasing a pipe, the method comprising:
- coupling a release collar to the end of a rotatable sleeve;
- coupling a pipe release element to the release collar to produce a first subassembly, wherein the rotatable sleeve and the release collar are rotatable with respect to the pipe release element;
- inserting a gripping element into a coupling body comprising a bore with a geometric axis into which a pipe can be inserted in a pipe insertion direction to produce a second subassembly;
- attaching the first subassembly to the second subassembly to produce a pipe coupling in which axial rotation of the rotatable sleeve in a first direction causes the release collar to move axially from a locked position to an unlocked position and in the unlocked position, the release collar can be moved axially in the pipe insertion direction to cause the pipe release element to disengage the gripping element from the surface of the pipe;
- wherein coupling the pipe release element to the release collar comprises threadably engaging a threaded outer surface of the pipe release element with a threaded inner surface of the release collar.

16. A method of assembling a pipe coupling for receiving, holding and releasing a pipe, the method comprising:
- coupling a release collar to the end of a rotatable sleeve;
- coupling a pipe release element to the release collar to produce a first subassembly, wherein the rotatable sleeve and the release collar are rotatable with respect to the pipe release element;
- inserting a gripping element into a coupling body comprising a bore with a geometric axis into which a pipe can be inserted in a pipe insertion direction to produce a second subassembly;
- attaching the first subassembly to the second subassembly to produce a pipe coupling in which axial rotation of the rotatable sleeve in a first direction causes the release collar to move axially from a locked position to an unlocked position and in the unlocked position, the release collar can be moved axially in the pipe insertion direction to cause the pipe release element to disengage the gripping element from the surface of the pipe;
- wherein, before coupling the pipe release element to the release collar, the pipe release element is coupled to a connecting element.

17. The method of claim 16, wherein the pipe release element is coupled to the connecting element to prevent rotation of the pipe release element with respect to the connecting element, and/or wherein the pipe release element is coupled to the connecting element to allow axial movement of the pipe release element with respect to the connecting element.

* * * * *